United States Patent [19]

Bindloss et al.

[11] Patent Number: 5,778,241
[45] Date of Patent: Jul. 7, 1998

[54] SPACE VECTOR DATA PATH

[75] Inventors: Keith M. Bindloss; Kenneth E. Garey, both of Irvine; George A. Watson, Fullerton; John Earle, Tustin, all of Calif.

[73] Assignee: Rockwell International Corporation, Newport Beach, Calif.

[21] Appl. No.: 630,231

[22] Filed: Apr. 10, 1996

Related U.S. Application Data

[63] Continuation of Ser. No. 238,558, May 5, 1994, abandoned.

[51] Int. Cl.$^6$ .................................................. G06F 15/80
[52] U.S. Cl. ................. 395/800.2; 395/570; 364/232.21; 364/231.9; 364/DIG. 1
[58] Field of Search .................................. 395/800, 375, 395/800.2, 800.02, 570; 364/232.21, 231.9, DIG. 1

[56] References Cited

U.S. PATENT DOCUMENTS

| | | | |
|---|---|---|---|
| 4,161,784 | 7/1979 | Cushing et al. | 364/748 |
| 4,481,580 | 11/1984 | Martin et al. | 395/309 |
| 4,777,593 | 10/1988 | Yoshida | 395/800 |
| 4,928,238 | 5/1990 | Sekiguchi | 395/800 |
| 5,212,777 | 5/1993 | Gove et al. | 395/375 |
| 5,239,654 | 8/1993 | Ing-Simmons et al. | 395/800 |
| 5,247,696 | 9/1993 | Booth | 395/800 |
| 5,396,625 | 3/1995 | Parkes | 395/600 |
| 5,475,856 | 12/1995 | Kogge | 395/800 |

FOREIGN PATENT DOCUMENTS

| | | |
|---|---|---|
| 0395348 | 10/1990 | European Pat. Off. |
| 0464601 | 1/1992 | European Pat. Off. |
| 2136172 | 9/1984 | United Kingdom |

OTHER PUBLICATIONS

Intel *i860*™ *64–Bit Microprocessor Programmer's Reference Manual* 1989, Chapter 1, Architectural Overview, pp. 1–1—1–6.

New PA-RISC Processor Decodes MPEG Video, HP's PA–7100LC Uses New Instructions to Eliminate Decoder Chip, *Microprocessor Report* Jan. 24, 1994, pp. 16–17.

*Primary Examiner*—John E. Harrity
*Attorney, Agent, or Firm*—William C. Cray; Philip K. Yu

[57] ABSTRACT

A space vector data path for integrating SIMD scheme into a general-purpose programmable processor. The programmable processor uses a mode field in each instruction to specify, for each instruction, whether an operand is processed in either one of vector or scalar modes. The programmable processor also has a plurality of sub-processing units for receiving the operand and, responsive to an instruction as specified by the mode field in each instruction, for processing the operand in either one of the vector or scalar modes, wherein the vector mode indicates to the plurality of sub-processing units that there are a plurality of elements within the operand and the scalar mode indicates to the plurality of sub-processing units that there is but one element within the operand. For the vector mode, each element is processed by one of the sub-processing units concurrently to generate a vector result. For the scalar mode, the sub-elements of the one element operand are processed by the sub-processing units concurrently but independently to generate a scalar result.

7 Claims, 32 Drawing Sheets

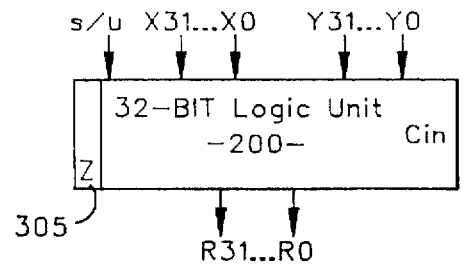
FIG. 4a
(Prior Art)
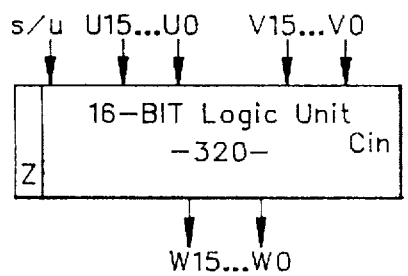
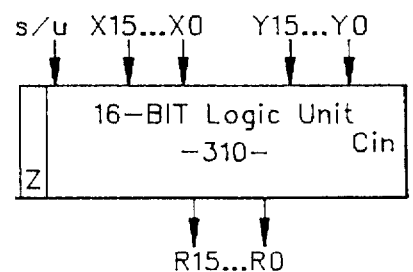
FIG. 4b
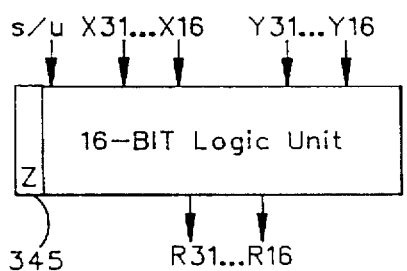
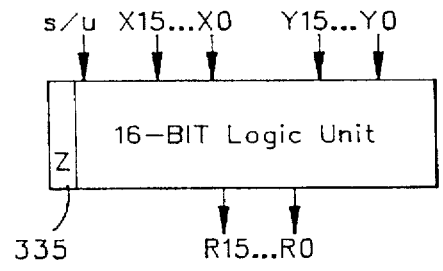
FIG. 4c

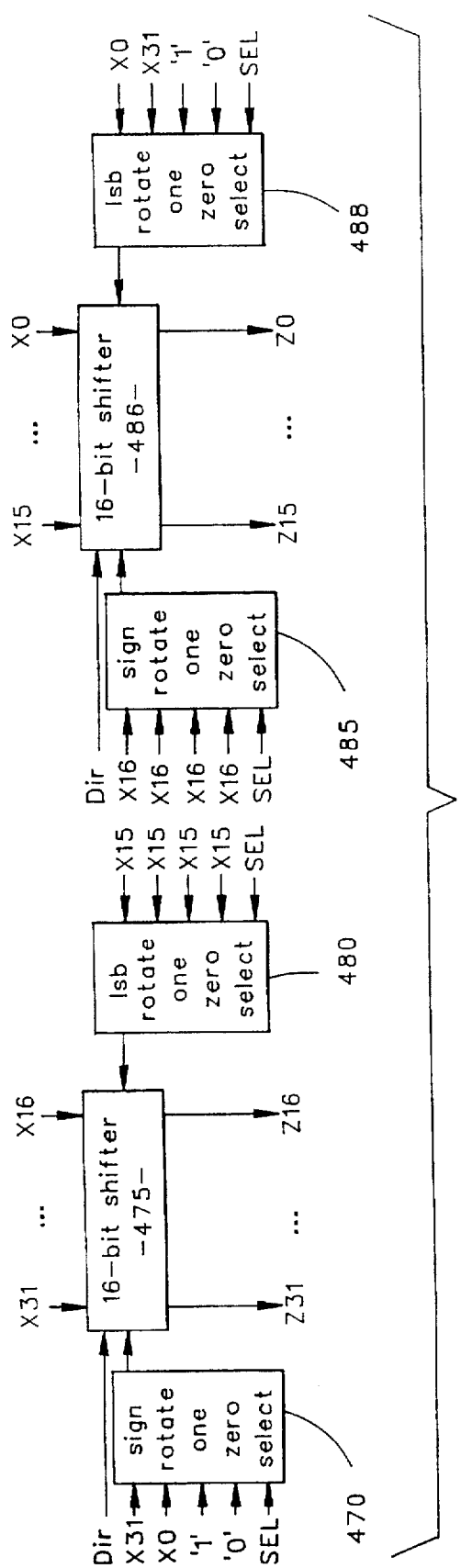
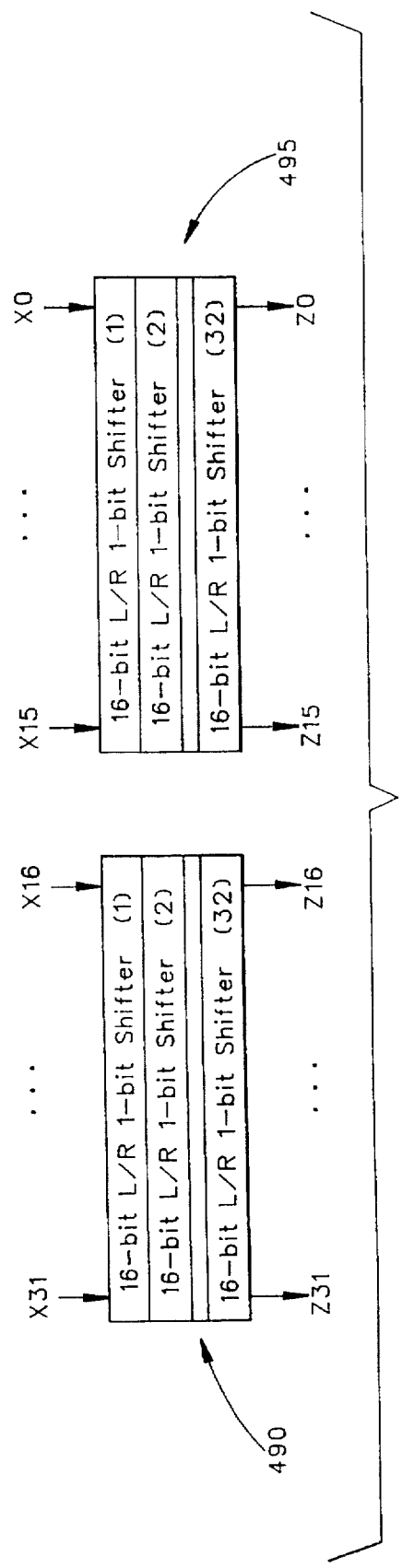
FIG. 5d
FIG. 5e

| Lower MAC Accumulator Register File | G0 | A0 |
|---|---|---|
| | G1 | A1 |
| | G2 | A2 |
| | G3 | A3 |
| Upper MAC Accumulator Register File | G4 | A4 |
| | G5 | A5 |
| | G6 | A6 |
| | G7 | A7 |
| | <Gx(8bits)> | <—— Ax — (32 bits) ——> |
| | <———————— AGx(40 bits) ————————> | |

FIG. 11

| x | AGx | AGCx | Ax | ACx |
|---|---|---|---|---|
| 0 | AG0 | AGC4 | A0 | A4 |
| 1 | AG1 | AGC5 | A1 | A5 |
| 2 | AG2 | AGC6 | A2 | A6 |
| 3 | AG3 | AGC7 | A3 | A7 |
| 4 | AG4 | AGC0 | A4 | A0 |
| 5 | AG5 | AGC1 | A5 | A1 |
| 6 | AG6 | AGC2 | A6 | A2 |
| 7 | AG7 | AGC3 | A7 | A3 |

FIG. 12

| Multiply Source Operand Format |  |
|---|---|
| TYPE | 16 Bit Source Operand Format |
| SI | S u u u u u u u u u u u u u u u. |
| UI | u u u u u u u u u u u u u u u u. |
| SF | S.u u u u u u u u u u u u u u u |
| UF | .u u u u u u u u u u u u u u u u |
| TYPE | 32 Bit Source Operand Format |
| SI | S u u u u u u u u u u u u u u u  u u u u u u u u u u u u u u u u. |
| UI | u u u u u u u u u u u u u u u u  u u u u u u u u u u u u u u u u. |
| SF | S.u u u u u u u u u u u u u u u  u u u u u u u u u u u u u u u u |
| UF | .u u u u u u u u u u u u u u u u  u u u u u u u u u u u u u u u u |

SI Signed int    SF Signed frac    S Sign bit
UI Unsigned int  UF Unsigned frac  u unsigned bit

FIG. 13

| 32-Bit Multiply Product Scaling (relative to accumulator) |
|---|

| 16x16 | G G G G G G G | A A A A A A A A A A A A A A A A | A A A A A A A A A A A A A A A A |
|---|---|---|---|
| SIxSI | s s s s s s s | s S u u u u u u u u u u u u u u u | u u u u u u u u u u u u u u u u. |
| SIxUI | s s s s s s s | S u u u u u u u u u u u u u u u u | u u u u u u u u u u u u u u u u. |
| UIxSI | s s s s s s s | S u u u u u u u u u u u u u u u u | u u u u u u u u u u u u u u u u. |
| UIxUI | o o o o o o o | u u u u u u u u u u u u u u u u u | u u u u u u u u u u u u u u u u. |
| SIxSF | s s s s s s s | s S u u u u u u u u u u u u u u u | u.u u u u u u u u u u u u u u u |
| SIxUF | s s s s s s s | S u u u u u u u u u u u u u u u u. | u u u u u u u u u u u u u u u u |
| UIxSF | s s s s s s s | S u u u u u u u u u u u u u u u u | u.u u u u u u u u u u u u u u u |
| UIxUF | o o o o o o o | u u u u u u u u u u u u u u u u u. | u u u u u u u u u u u u u u u u |
| SFxSI | s s s s s s s | s S u u u u u u u u u u u u u u u | u.u u u u u u u u u u u u u u u |
| SFxUI | s s s s s s s | S u u u u u u u u u u u u u u u u | u.u u u u u u u u u u u u u u u |
| UFxSI | s s s s s s s | S u u u u u u u u u u u u u u u u. | u u u u u u u u u u u u u u u u |
| UFxUI | o o o o o o o | u u u u u u u u u u u u u u u u u. | u u u u u u u u u u u u u u u u |
| SFxSF | s s s s s s s | S.u u u u u u u u u u u u u u u u | u u u u u u u u u u u u u u u u * |
| SFxUF | s s s s s s s | S.u u u u u u u u u u u u u u u u | u u u u u u u u u u u u u u u u |
| UFxSF | s s s s s s s | S.u u u u u u u u u u u u u u u u | u u u u u u u u u u u u u u u u |
| UFxUF | o o o o o o o. | u u u u u u u u u u u u u u u u u | u u u u u u u u u u u u u u u u |

\* Product is left shifted by one bit position for 16x16, SFxSF multiply only.
SI Signed int    SF Signed frac      S Sign bit       s Sign extend bit    G Guard bit
UI Unsigned int  UF Unsigned frac    u unsigned bit   o Zero extend bit    A Accum bit

48-Bit Multiply Right Justified Product Scaling (relative to accumulator)

Guarded Accumulator in Upper MAC

```
16x32  G G G G G G G  A A A A A A A A A A A A A A A A  A A A A A A A A A A A A A A A A

SIxSI  s s s s s s s  s s s s s s s s s s s s s s s s  s S u u u u u u u u u u u u u u
SIxUI  s s s s s s s  s s s s s s s s s s s s s s s s  S u u u u u u u u u u u u u u u
UIxSI  s s s s s s s  s s s s s s s s s s s s s s s s  S u u u u u u u u u u u u u u u
UIxUI  o o o o o o o  o o o o o o o o o o o o o o o o  u u u u u u u u u u u u u u u u

SIxSF  s s s s s s s  s s s s s s s s s s s s s s s s  s S u u u u u u u u u u u u u u
SIxUF  s s s s s s s  s s s s s s s s s s s s s s s s  S u u u u u u u u u u u u u u u.
UIxSF  s s s s s s s  s s s s s s s s s s s s s s s s  S u u u u u u u u u u u u u u u
UIxUF  o o o o o o o  o o o o o o o o o o o o o o o o  u u u u u u u u u u u u u u u u.

SFxSI  s s s s s s s  s s s s s s s s s s s s s s s s  s S u u u u u u u u u u u u u u
SFxUI  s s s s s s s  s s s s s s s s s s s s s s s s  S u u u u u u u u u u u u u u u
UFxSI  s s s s s s s  s s s s s s s s s s s s s s s s  S u u u u u u u u u u u u u u u
UFxUI  o o o o o o o  o o o o o o o o o o o o o o o o  u u u u u u u u u u u u u u u u

SFxSF  s s s s s s s  s s s s s s s s s s s s s s s s  s S.u u u u u u u u u u u u u u
SFxUF  s s s s s s s  s s s s s s s s s s s s s s s s  S.u u u u u u u u u u u u u u u
UFxSF  s s s s s s s  s s s s s s s s s s s s s s s s  S.u u u u u u u u u u u u u u u
UFxUF  o o o o o o o  o o o o o o o o o o o o o o o o. u u u u u u u u u u u u u u u u
```

FIG. 15B

Guarded Accumulator in Lower MAC

```
16x32  G G G G G G G  A A A A A A A A A A A A A A A A  A A A A A A A A A A A A A A A A

SIxSI  o o o o o o o  u u u u u u u u u u u u u u u u  u u u u u u u u u u u u u u u u.
SIxUI  o o o o o o o  u u u u u u u u u u u u u u u u  u u u u u u u u u u u u u u u u.
UIxSI  o o o o o o o  u u u u u u u u u u u u u u u u  u u u u u u u u u u u u u u u u.
UIxUI  o o o o o o o  u u u u u u u u u u u u u u u u  u u u u u u u u u u u u u u u u.

SIxSF  o o o o o o o  u.u u u u u u u u u u u u u u u  u u u u u u u u u u u u u u u u
SIxUF  o o o o o o o. u u u u u u u u u u u u u u u u  u u u u u u u u u u u u u u u u
UIxSF  o o o o o o o  u.u u u u u u u u u u u u u u u  u u u u u u u u u u u u u u u u
UIxUF  o o o o o o o  u u u u u u u u u u u u u u u u  u u u u u u u u u u u u u u u u

SFxSI  o o o o o o o  u u u u u u u u u u u u u u u u  u.u u u u u u u u u u u u u u u
SFxUI  o o o o o o o  u u u u u u u u u u u u u u u u  u.u u u u u u u u u u u u u u u
UFxSI  o o o o o o o  u u u u u u u u u u u u u u u u. u u u u u u u u u u u u u u u u
UFxUI  o o o o o o o  u u u u u u u u u u u u u u u u. u u u u u u u u u u u u u u u u

SFxSF  o o o o o o o  u u u u u u u u u u u u u u u u  u u u u u u u u u u u u u u u u
SFxUF  o o o o o o o  u u u u u u u u u u u u u u u u  u u u u u u u u u u u u u u u u
UFxSF  o o o o o o o  u u u u u u u u u u u u u u u u  u u u u u u u u u u u u u u u u
UFxUF  o o o o o o o  u u u u u u u u u u u u u u u u  u u u u u u u u u u u u u u u u
```

| SI Signed int | SF Signed frac | S Sign bit | s Sign extend bit | G Guard bit |
| UI Unsigned int | UF Unsigned frac | u unsigned bit | o Zero extend bit | A Accum bit |

48-Bit Multiply Left Justified Product Scaling
(relative to accumulator)

Guarded Accumulator in Upper MAC

| 16x32 | G G G G G G G | A A A A A A A A A A A A A A A A | A A A A A A A A A A A A A A A A |
|---|---|---|---|
| SIxSI | s s s s s s s s | s S u u u u u u u u u u u u u u u | u u u u u u u u u u u u u u u u |
| SIxUI | s s s s s s s s | S u u u u u u u u u u u u u u u | u u u u u u u u u u u u u u u u |
| UIxSI | s s s s s s s s | S u u u u u u u u u u u u u u u | u u u u u u u u u u u u u u u u |
| UIxUI | o o o o o o o | u u u u u u u u u u u u u u u u | u u u u u u u u u u u u u u u u |
| SIxSF | s s s s s s s | s S u u u u u u u u u u u u u u | u.u u u u u u u u u u u u u u u |
| SIxUF | s s s s s s s | S u u u u u u u u u u u u u u u. | u u u u u u u u u u u u u u u u |
| UIxSF | s s s s s s s | S u u u u u u u u u u u u u u u | u.u u u u u u u u u u u u u u u |
| UIxUF | o o o o o o o | u u u u u u u u u u u u u u u u. | u u u u u u u u u u u u u u u u |
| SFxSI | s s s s s s s | s S u u u u u u u u u u u u u u | u u u u u u u u u u u u u u u u |
| SFxUI | s s s s s s s | S u u u u u u u u u u u u u u u | u u u u u u u u u u u u u u u u |
| UFxSI | s s s s s s s | S u u u u u u u u u u u u u u u | u u u u u u u u u u u u u u u u. |
| UFxUI | o o o o o o o | u u u u u u u u u u u u u u u u | u u u u u u u u u u u u u u u u. |
| SFxSF | s s s s s s s | s S.u u u u u u u u u u u u u u | u u u u u u u u u u u u u u u u |
| SFxUF | s s s s s s s | S.u u u u u u u u u u u u u u u | u u u u u u u u u u u u u u u u |
| UFxSF | s s s s s s s | S.u u u u u u u u u u u u u u u | u u u u u u u u u u u u u u u u |
| UFxUF | o o o o o o o | o.u u u u u u u u u u u u u u u | u u u u u u u u u u u u u u u u |

FIG. 16A

Guarded Accumulator in Lower MAC

| 16x32 | G G G G G G G | A A A A A A A A A A A A A A A A | A A A A A A A A A A A A A A A A |
|---|---|---|---|
| SIxSI | o o o o o o o | u u u u u u u u u u u u u u u u. | o o o o o o o o o o o o o o o o |
| SIxUI | o o o o o o o | u u u u u u u u u u u u u u u u. | o o o o o o o o o o o o o o o o |
| UIxSI | o o o o o o o | u u u u u u u u u u u u u u u u. | o o o o o o o o o o o o o o o o |
| UIxUI | o o o o o o o | u u u u u u u u u u u u u u u u. | o o o o o o o o o o o o o o o o |
| SIxSF | o o o o o o o | u u u u u u u u u u u u u u u u | o o o o o o o o o o o o o o o o |
| SIxUF | o o o o o o o | u u u u u u u u u u u u u u u u | o o o o o o o o o o o o o o o o |
| UIxSF | o o o o o o o | u u u u u u u u u u u u u u u u | o o o o o o o o o o o o o o o o |
| UIxUF | o o o o o o o | u u u u u u u u u u u u u u u u | o o o o o o o o o o o o o o o o |
| SFxSI | o o o o o o o | u.u u u u u u u u u u u u u u u | o o o o o o o o o o o o o o o o |
| SFxUI | o o o o o o o | u.u u u u u u u u u u u u u u u | o o o o o o o o o o o o o o o o |
| UFxSI | o o o o o o o | u u u u u u u u u u u u u u u u | o o o o o o o o o o o o o o o o |
| UFxUI | o o o o o o o | u u u u u u u u u u u u u u u u | o o o o o o o o o o o o o o o o |
| SFxSF | o o o o o o o | u u u u u u u u u u u u u u u u | o o o o o o o o o o o o o o o o |
| SFxUF | o o o o o o o | u u u u u u u u u u u u u u u u | o o o o o o o o o o o o o o o o |
| UFxSF | o o o o o o o | u u u u u u u u u u u u u u u u | o o o o o o o o o o o o o o o o |
| UFxUF | o o o o o o o | u u u u u u u u u u u u u u u u | o o o o o o o o o o o o o o o o |

SI Signed int    SF Signed frac    S Sign bit    s Sign extend bit    G Guard bit
UI Unsigned int    UF Unsigned frac    u unsigned bit    o Zero extend bit    A Accum bit

FIG. 16B

RSP™ Instruction Set Summary – Operation Order

| MNEMONIC | ASSEMBLER SYNTAX | OPERATION |
|---|---|---|
| L.<lq> | L.WP dest,mem_loc | Load register – word pair. |
| | L[.W] dest,mem_loc | Load register – word. |
| | L.H[S] dest,mem_loc | Load register – halfword signed. |
| | L.HU dest,mem_loc | Load register – halfword unsigned. |
| | L.HF dest,mem_loc | Load register – halfword fraction. |
| | L.HM dest,mem_loc | Load register – halfword and merge. |
| | L.HFM dest,mem_loc | Load register – halfword fraction and merge. |
| | L.HD dest,mem_loc | Load register – halfword double. |
| | L.B[S] dest,mem_loc | Load register – byte signed. |
| | L.BU dest,mem_loc | Load register – byte unsigned. |
| | L.BF dest,mem_loc | Load register – byte fraction. |
| | L.BFM dest,mem_loc | Load register – byte fraction and merge. |
| | L.HP dest,mem_loc | Load register – halfword pair. |
| | L.BP dest,mem_loc | Load register – byte pair. |
| | L.BPU dest,mem_loc | Load register – byte pair unsigned. |
| | L.BPF dest,mem_loc | Load register – byte pair fraction. |
| LS.<lsq> | LS.WCCM dest,src | Load streamer – word context and context and merge. |
| | LS.WCX dest,src | Load streamer – word context and index. |
| | LS.WPCC dest,src | Load streamer – word pair context and context. |
| | LS.WPCX dest,src | Load streamer – word pair context and index. |
| | LS.WPCXM dest,src | Load streamer – word pair context and index and merge. |
| | LS.WPD dest,src | Load streamer – word pair data. |
| | LS.WPXX dest,src | Load streamer – word pair index and index. |
| | LS.WXX dest,src | Load streamer – word index and index. |
| | LS.WXXM dest,src | Load streamer – word index and index and merge. |

*FIG. 23a*

| MNEMONIC | ASSEMBLER SYNTAX | OPERATION |
|---|---|---|
| S.<srq> | S.W src,mem_loc | Store word. |
| | S.H src,mem_loc | Store least significant halfword. |
| | S.HS src,mem_loc | Alias for S.H. |
| | S.HU src,mem_loc | Alias for S.H. |
| | S.HF src,mem_loc | Store most significant halfword (fraction). |
| | S.B src_mem_loc | Store most significant byte. |
| | S.BU src_mem_loc | Alias for S.B. |
| | S.BS src,mem_loc | Alias for S.B. |
| | S.BF src,mem_loc | Store most significant byte (fraction). |
| | S.HP src,mem_loc | Store halfword pair. |
| | S.BP src,mem_loc | Store least significant bytes of halfword pair. |
| | S.BPF src,mem_loc | Store most significant bytes of halfword pair. |
| SS.<ssq> | SS.WPCX src,mem_loc | Store streamer word pair, context and index. |
| | SS.WPDS src,mem_loc | Store streamer word pair, data and status. |
| | SS.WS | Store streamer word status. |
| SA.<pq>.<ar> | SA src,mem_loc,#sift_count | Store scaled accumulator. |
| RSE | RSE #reg_pair_count,#stack_size,#bitmask | Reserve and set enables. |
| MS | MS.X dest,src | Modify streamer index. |
| IS.<isq> | IS.C dest,reg | Initialize streamer context. |
| | IS.CC dest_1,dest_2,reg | Initialize streamer context and context. |
| | IS.CMH dest,#imm | Initialize streamer context and merge high. |
| | IS.CML dest,#imm | Initialize streamer context and merge low. |
| | IS.CX dest,reg | Initialize streamer context and index. |
| | IS.D dest | Initialize streamer data. |
| | IS.DD dest_1,dest_2 | Initialize streamer data and data. |
| | IS.X dest,src | Initialize streamer index. |
| | IS.X dest,#imm | Initialize streamer index. |
| | IS.XM dest,#imm | Initialize streamer index and merge. |
| | IS.XX dest_1,dest_2,src | Initialize streamer index and index. |

*FIG. 23b*

| MNEMONIC | ASSEMBLER SYNTAX | OPERATION |
| --- | --- | --- |
| LI.<liq> | LI[S] dest,#imm_16 | Load register immediate signed. |
| | LI.U dest,#imm_16 | Load register immediate unsigned. |
| | LI.F dest,#imm_16 | Load register immediate fraction (signed). |
| | LI.FM dest,#imm_16 | Load register immediate fraction and merge (signed). |
| | LI.M dest,#imm_16 | Load register immediate and merge (signed integer). |
| | LI.D dest,#imm_16 | Load register immediate double (signed integer). |
| | LI.UD dest #imm_16 | Load register immediate double (signed integer). |
| | LI.FD dest,#imm_16 | Load register immediate fraction double (signed). |
| | LI.MD dest,#imm_16 | Load register immediate and merge double (integer). |
| M.<pq> | M[.W] | Move word. |
| | M.HP | Move halfword pair. (Alias for M.HP.) |
| MCC | MCC.HP dest,src | Move if C bit is clear. |
| | MCC[.W].<cc> dest,src | |
| MCS | MCS.HP dest,src | Move if C bit is set. |
| | MCS[.W].<cc> dest,src | |
| MVC | MVC.HP dest,src | Move if V bit is clear. |
| | MVC[.W].<cc> dest,src | |
| MVS | MVS.HP dest,src | Move if V bit is set. |
| | MVS[.W].<cc> dest,src | |
| MZC | MZC.HP dest,src | Move if Z bit is clear. |
| | MZC[.W].<cc> dest,src | |
| MZS | MZS.HP dest,src | Move if Z bit is set. |
| | MZS[.W].<cc> dest,src | |
| MZ | MZ.HP dest,src,_1,src_2 | Move if equal to zero. |
| | MZ[.W].<rc1a> dest,src_1,src_2 | |
| MNZ | MNZ.HP dest,src,_1,src_2 | Move if not equal to zero. |
| | MNZ[.W].<rc1b> dest,src_1,src_2 | |
| MLT | MLT.HP dest,src_1,src_2 | Move if less than. |
| | MLT[.W] dest,src_1,src_2 | |
| MGT | MGT[.W] dest,src_1,src_2 | Move if greater than. |
| MLE | MLE[.W] dest,src_1,src_2 | Move if less than or equal. |
| MGE | MGE.HP dest,src_1,src_2 | Move if greater than or equal. |
| | MGE[.W] dest,src_1,src_2 | |

*FIG. 23c*

| MNEMONIC | ASSEMBLER SYNTAX | OPERATION |
|---|---|---|
| MBZ.<pq> | MBZ dest,src_1,src_2,#bit_num | Move bit on zero. |
| MBNZ.<pq> | MBNZ dest,src_1,src_2,#bit_num | Move bit on not zero. |
| MRA.<mq> | MRA.B dest,src | Move register to accumulator – byte. |
| | MRA.H dest,src | Move register to accumulator – halfword. |
| | MRA.HP dest,src | Move register to accumulator – halfword pair. |
| | MRA[.W] dest,src | Move register to accumulator – word. |
| MAR.<pq>.<ar> | NAR dest,src_1,src_2 | Move scaled accumulator to register. |
| PK.<pkq> | PK.HPLL dest,src_1,src_2 | Pack halfword pair low low. |
| | PK.HPLH dest,src_1,src_2 | Pack halfword pair low high. |
| | PK.HPHL dest,src_1,src_2 | Pack halfword pair high low. |
| | PK.HPHH dest,src_1,src_2 | Pack halfword pair high high. |
| | PK.BPL dest,src_1,src_2 | Pack byte pair low. |
| | PK.BP dest,src_1,src_2 | Alias for PK.BPL. |
| | PK.BPH dest,src_1,src_2 | Pack byte pair high. |
| B.<e1> | B ofs_16 | Unconditional branch. |
| BCC.<e2>.<cc> | BCC ofs_12 | Branch if C bit is clear. |
| BCS.<e2>.<cc> | BCC ofs_12 | Branch if C bit is set. |
| BVC.<e2>.<cc> | BVC ofs_12 | Branch if V bit is clear. |
| BVS.<e2>.<cc> | BVS ofs_12 | Branch if V bit is set. |
| BZC.<e2>.<cc> | BZC ofs_12 | Branch if Z bit is clear. |
| BZS.<e2>.<cc> | BZS ofs_12 | Branch if Z bit is set. |
| BZ.<e2>.<rc1a> | BZ reg,ofs_12 | Branch if register equal to zero. |
| BNZ.<e2>.<rc1b> | BNZ reg,ofs_12 | Branch if register not equal to zero. |
| BLT.<e2>.<rc2> | BLT reg,offs_12 | Branch if register less-than zero. |
| BGE.<e2>.<rc2> | BGE reg,ofs_12 | Branch if register greater-than or equal to zero. |
| BGT.<e2> | BGT reg,offs_12 | Branch if register greater-than zero. |
| BLE.<e2> | BLE reg,offs_12 | Branch if register less-than or equal to zero. |

*FIG. 23d*

| MNEMONIC | ASSEMBLER SYNTAX | OPERATION |
| --- | --- | --- |
| BBZ.<e2> | BBZ reg,#bit_num,ofs_8 | Branch on bit equal to zero. |
| BBNZ.<e2> | BBNZ reg,#bit_num,ofs_8 | Branch on bit not equal to zero. |
| BBCZ.<e2> | BBCZ reg,#bit_num,ofs_8 | Branch on bit equal to zero, and complement bit. |
| BBCNZ.<e2> | BBCNZ reg,#bit_num,ofs_8 | Branch on bit not equal to zero, and complement bit. |
| BEQ.<e2> | BEQ reg_1,reg_2,ofs_8 | Branch if registers match. |
| BNE.<e2> | BNE reg_1,reg_2,ofs_8 | Branch if registers are not equal. |
| BNZD.<e2> | BNZD reg,#imm,ofs_12 | Branch if not zero, and decrement. |
| BNZI.<e2> | BNZI reg,#imm,offs_12 | Branch if not zero, and increment. |
| J.<e1> | J addr_22 | Jump. |
| J.<e1>.<db> | J (reg) | |
| JSB.<e1>.<db> | JSB (reg,streamer)<br>JSB ((reg,streamer)) | Jump streamer byte. |
| JSH.<e1>.<db> | JSH (reg,streamer)<br>JSH ((reg,streamer)) | Jump streamer halfword. |
| JC.<e1>.<db> | JC (reg_1,reg_2)<br>JC ((reg_1,reg_2)) | Jump conditional. |
| JCSB.<e1>.<db> | JCSB (streamer,reg)<br>JCSB ((streamer,reg)) | Jump conditional streamer byte. |
| JCSH.<e1>.<db> | JCSH (streamer,reg)<br>JCSH ((streamer,reg)) | Jump conditional streamer halfword. |
| CALL.<e1> | CALL addr_22,#reg_count<br>CALL reg,#reg_count | Call subroutine. |
| TRAP<e1> | TRAP addr_22<br>TRAP (reg) | Trap. |
| TRAPC.<e2> | TRAPC addr_22<br>TRAPC (reg) | Conditional trap. |

*FIG. 23e*

| MNEMONIC | ASSEMBLER SYNTAX | OPERATION |
| --- | --- | --- |
| RETE.<el> | RETE | Return from exception. |
| RETI.<el> | RETI | Return from interrupt. (Alias for RETE.) |
| RETT.<el> | RETT | Return from trap. (Alias for RETE.) |
| RETQ | RETQ | Return from quick interrupt / exception. |
| NOP.<nq> | NOP[.0]<br>NOP.1 | No operation – zero bits.<br>No operation – one bits. |
| LOOP.<ac>.<rq> | LOOP ofs_8,reg<br>LOOP ofs_8,#loop_count | High speed loop. |
| WAIT | WAIT | Wait. |
| HALT | HALT | Halt. |
| BREAK | BREAK | Breakpoint. |
| ABS.<pq>.<ar> | ABS dest, src | Absolute value. |
| NEG.<pq>.<aq> | NEG dest,src | Negate (one's complement). |
| NOT.<pq> | NOT dest,src | One's complement. |
| PARE.<pq> | PARE dest,src | Logical parity even. |
| PARO.<pq> | PARO dest,src | Logical parity odd. |
| REV.<pq> | REV dest,src | Bit reversal. |
| ADD[S].<pq>.<ar> | ADD dest,src_1,src_2<br>ADD dest,src_1,#imm | Add (signed). |
| ADDU.<pq>.<ar> | ADD dest,src_1,src_2<br>ADD dest,src_1,#imm | Add unsigned. |
| ADDC[S].<pq>.<ar> | ADDC dest,src_1,src_2 | Add with carry. |
| ADDCU.<pq>.<ar> | ADDCU dest,src_1,src_2 | Add with carry unsigned. |
| SUB[S].<pq>.<ar> | SUB[S] dest,src_1,src_2<br>SUB[S] dest,src_1,#imm | Subtract (signed). |
| SUBU.<pq>.<ar> | SUBU dest,src_1,src_2<br>SUBU dest,src_1,#imm | Subtract unsigned. |
| SUBC[S].<pq>.<ar> | SUBC[S] dest,src_1,src_2 | Subtract with carry (signed). |
| SUBCU.<pq>.<ar> | SUBCU dest,src_1,src_2 | Subtract with carry unsigned. |
| SUBR[S].<pq>.<ar> | SUBR[S] dest,src_1,#imm | Reverse subtract (signed). |

*FIG. 23f*

| MNEMONIC | ASSEMBLER SYNTAX | OPERATION |
|---|---|---|
| SUBRU.<pq>.<ar> | SUBRU dest,src_1,#imm | Reverse subtract unsigned. |
| ASC.<pq> | ASC dest, src_1,src_2,#bit_num | Add/subtract conditional. |
| MIN[S] | MIN dest,src_1,src_2 | Minimum (signed). |
| MINU | MINU dest,src_1,src_2 | Minimum unsigned. |
| MAX[S].<pq> | MAX dest,src_1,src_2 | Maximum (signed). |
| MAXU.<pq> | MAXU dest,src_1,src_2 | Maximum unsigned. |
| TEQ.<pq> | TEQ dest,src_1,src_2<br>TEQ dest,src_1,#imm | Test register equal to zero. |
| TNE.<pq> | TNE[S] dest,src_1,src_2<br>TNE[S] dest,src_1,#imm | Test register not equal to zero. |
| TLT[S].<pq> | TLT[S] dest,src_1,src_2<br>TLT[S] dest,src_1,#imm | Test register less than zero (signed). |
| TGT[S].<pq> | TGT[S] dest,src_1,src_2<br>TGT[S] dest,src_1,#imm | Test register greater than zero (signed). |
| TLE[S].<pq> | TLE[S] dest,src_1,.src_2<br>TLE[S] dest,src_1,#imm | Test register less than or equal to zero (signed). |
| TGE[S].<pq> | TGE[S] dest,src_1,src_2<br>TGE[S] dest,src_1,imm | Test register greater than or equal to (signed). |
| TLTU.<pq> | TLTU dest,src_1,src_2<br>TLTU dest,src_1,#imm | Test register less than zero unsigned. |
| TGTU.<pq> | TGTU dest,src_1,src_2<br>TGTU dest,src_1,#imm | Test register greater than zero unsigned. |
| TLEU.<pq> | TLEU dest,src_1,src_2<br>TLEU dest,src_1,#imm | Test register less than or equal to zero unsigned. |
| TGEU.<pq> | TGEU dest,src_1,src_2<br>TGEU dest,src_1,#imm | Test register greater than or equal to unsigned. |
| TAND.<pq> | TAND dest,src_1,src_2<br>TAND dest,src_1,#imm | Test result of bitwise AND. |
| TOR.<pq> | TOR dest,src_1,src_2<br>TOR dest,src_1,#imm | Test result of bitwise OR. |
| SBIT.<pq> | SBIT dest,src_1,src_2 | Set bit. |
| CBIT.<pq> | CBIT dest,src_1,src_2 | Clear bit. |
| IBIT.<pq> | IBIT dest,src_1,src_2 | Invert bit. |
| TBZ.<pq> | TBZ dest,src_1,src_2<br>TBZ dest,src_1,#imm | Test bit zero. |

*FIG. 23g*

| MNEMONIC | ASSEMBLER SYNTAX | OPERATION |
|---|---|---|
| TBNZ.<pq> | TBNZ dest,src_1,src_2<br>TBZ dest,src_1,#imm | Test bit non-zero. |
| AND.<pq> | AND dest,src_1,src_2<br>AND dest,src_1,#imm | Bitwise AND. |
| ANDN.<pq> | ANDN dest,src_1,src_2<br>ANDN dest,src_1,src_2 | Bitwise AND-NOT. |
| OR.<pq> | OR dest,src_1,src_2<br>OR dest,src_1,#imm | Bitwise OR. |
| XOR.<pq> | XOR dest,src_1,src_2 | Bitwise XOR. |
| XORC.<pq> | XORC dest,src_1,src_2 | Conditional bitwise XOR. |
| SHR.<pq> | SHR dest,src_1,src_2<br>SHR dest,src_1#imm | Shift right logical. |
| SHL.<pq> | SHL dest,src_1,src_2<br>SHL dest,src_1,#imm | Shift left logical. |
| SHRA.<pq> | SHRA dest,src_1,src_2<br>SHRA dest,src_1,#imm | Shift right arithmetic. |
| SHRC.<pq> | SHRC dest,src_1,src_2<br>SHRC dest,src_1,#Imm | Shift right with carry. |
| ROR.<pq> | ROR dest,src_1,src_2<br>ROR dest,src_1,#imm | Rotate right. |
| ROL.<pq> | ROL dest,src_1,src_2<br>ROL dest,src_1,#imm | Rotate left. |
| INS | INS dest,src,#shift_count,#bit_count | Insert. |
| EXT | EXT dest,src,#shift_count,#bit_count | Extract. |
| CNT | CNT.LSO dest,src<br>CNT.LSZ dest,src<br>CNT.LSR dest,src<br>CNT.MSO dest,src<br>CNT.MSZ dest,src<br>CNT.MSR dest,src | Count least significant one bits.<br>Count least significant zero bits.<br>Count least significant run of bits.<br>Count most significant one bits.<br>Count most significant zero bits.<br>Count most significant run of bits. |

*FIG. 23h*

| MNEMONIC | ASSEMBLER SYNTAX | OPERATION |
| --- | --- | --- |
| CEXP | CEXP dest,src_1,src_2 | Compare exponents. |
| MEXP | MEXP dest,src | Measure exponent. |
| SYM | SYM dest,src,#table_type,#shift_count | Symmetrical table address. |
| ACC | ACC.<ar> dest, src_1,src_2<br>ACC.<pq>.<ar> dest,src_1<br>ACC.<pq>.<ar> dest,#imm | Accumulate. |
| ACCN | ACCN.<ar> dest,src_1,src_2<br>ACCN.<pq>.<ar> dest,src_1<br>ACCN.<pq>.<ar> dest,#imm | Accumulate negative. |
| MUL.<pq>.<rq> | MUL dest,src_1, src_2<br>MUL dest,src_1,#imm | Multiply. |
| MAC.<pq>.<ar> | MAC dest_1,src_1,src_2,src_3 | Multiply and accumulate. |
| MACN.<pq>.<ar> | MACN dest_1,src_1,src_2,dest_3 | Multiply and accumulate negative. |
| UMUL.<uq>.<uq> | UMUL dest,src_1,src_2 | Universal halfword pair multiply. |
| UMAC.<uq>.<uq> | UMAC dest_1,dest_2,src_1,src_2 | Universal halfword pair multiply and accumulate. |
| DMUL.<jq> | DMUL dest,src_1,src_2 | Double multiply step. |
| DMULN.<jq> | DMULN dest,src_1,src_2 | Double multiply step negative. |
| DMAC.<jq> | DMAC dest,src_1,src_2,src_3 | Double multiply and accumulate step. |
| DMACN.<jq> | DMACN dest,src_1,src_2,src_3 | Double multiply and accumulate step negative. |

*FIG. 23i*

SPACE VECTOR DATA PATH

This is a continuation application of parent application Ser. No. 08/238,558, filed on May 5, 1994, now abandoned.

FIELD OF THE INVENTION

The present invention relates to signal processors and more particularly to digital signal processor with spatial parallel processing capabilities.

BACKGROUND OF THE INVENTION

Computers with parallel processing schemes such as single instruction-multiple data (SIMD) has gradually gained its share of recognition in the computer art in recent years. SIMD computers can be conceptually illustrated in FIG. 1(a), where multiple processing elements (PE's) are supervised by one main sequencer. All PE's receive the same instruction broadcast from the main sequencer but operate on different data sets from distinct data streams. As shown in FIG. 1(b), each PE functions as a central processing unit (CPU) with its own local memory. Therefore, SIMD computers can achieve spatial parallelism by using multiple synchronized arithmetic logic units with each PE's CPU. While it is relatively easy for the individual PE's to handle its data once the data is in each PE, distributing and communicating among all the PE's through the interconnections (not shown) is quite a complex task. Thus, SIMD machines are usually designed with special purposes in mind and their difficulty in programming and vectorization makes them undesirable for general purpose applications.

On the other hand, current general purpose computing machines, such as SPARC (R), PowerPC (R), and 68000-based machines, typically are not fully utilizing their 32-bit memory space when it comes to high performance graphics processing. For example, data are still limited to be processed at 16-bit width, or 8-bit pixels for video and image information, while their busses are 32-bit wide. However, these general purpose machines are attractive for their programming convenience in a high level language software environment. Therefore, it is desirable to strike a balance between SIMD's speed advantage as applied to digital signal processing and general purpose CPU's programming convenience. This way, even a low performance implementation of a SIMD machine, when integrated into a general purpose machine, may drastically improve the overall throughput just as if there were multiple scalar CPU's working in parallel. However, with SIMD integrated into a general-purpose machine, the increased throughput will not come at the expense of silicon usage typically associated with the multiple units of scalar CPU's found in a traditional SIMD machine.

Therefore, it would be desirable to have a general purpose processor with SIMD capability for code intensive applications, as well as speed intensive computations.

An object of the present invention is to integrate a SIMD scheme into a general purpose CPU architecture to enhance throughput.

It is also an object of the present invention to enhance throughput without incurring substantial silicon usage.

It is further an object of the present invention to increase throughput in proportional to the number of data elements processed in each instruction with the same instruction execution rate.

SUMMARY OF THE INVENTION

A space vector data path for integrating a SIMD scheme into a general-purpose programmable processor is disclosed.

The programmable processor comprises mode means coupled to an instruction means for specifying for each instruction whether an operand is processed in one of vector and scalar modes, processing unit coupled to the mode means for receiving the operand and, responsive to an instruction as specified by the mode means, for processing the operand in one of the vector and scalar modes, wherein the vector mode indicating to the processing unit that there are a plurality of elements within the operand and the scalar mode indicating to the processing unit that there is one element within the operand.

The present invention also discloses a method of performing digital signal processing through multiple data path using a general-purpose computer, where the general-purpose computer comprises data memory for storing a plurality of operands with each operand having at least one element, and a processing unit having a plurality of sub-processing units. The method comprises the steps of a) providing an instruction from among a predetermined sequence of instructions to be executed by the processing unit; b) the instruction specifying one of scalar and vector mode of processing by the processing unit on the operand, the scalar mode indicating to the processing unit that there are one element within the operand, and the vector mode indicating to said processing unit that there are a plurality of sub-elements within the operand; c) if scalar mode, each sub-processing unit of the processing unit, responsive to the instruction, receiving a respective portion of the operand to process to generate a partial and intermediate result; d) each sub-processing unit passing its intermediate result among the plurality of sub-processing units and merging its partial result with the other sub-processing units to generate a final result for the operand; e) generating first condition codes to correspond to the final result; f) if vector mode, each sub-processing unit of the processing unit, responsive to the instruction, receiving and processing a respective sub-element from the plurality of sub-elements within the operand to generate a partial and intermediate result with each intermediate result being disabled and each partial result representing a final result for its corresponding element; g) generating a plurality of second condition codes with each of the second condition codes corresponding to an independent result.

BRIEF DESCRIPTION OF THE DRAWINGS

FIG. 4a is a symbolic diagram of a conventional logic unit which may be incorporated in the ALU for the processing unit.

FIGS. 4b and 4c are symbolic diagrams of logic units which may implement the present invention.

FIG. 5c–5e are diagrams of shifters which may incorporate the present invention.

3

Figure 6A:
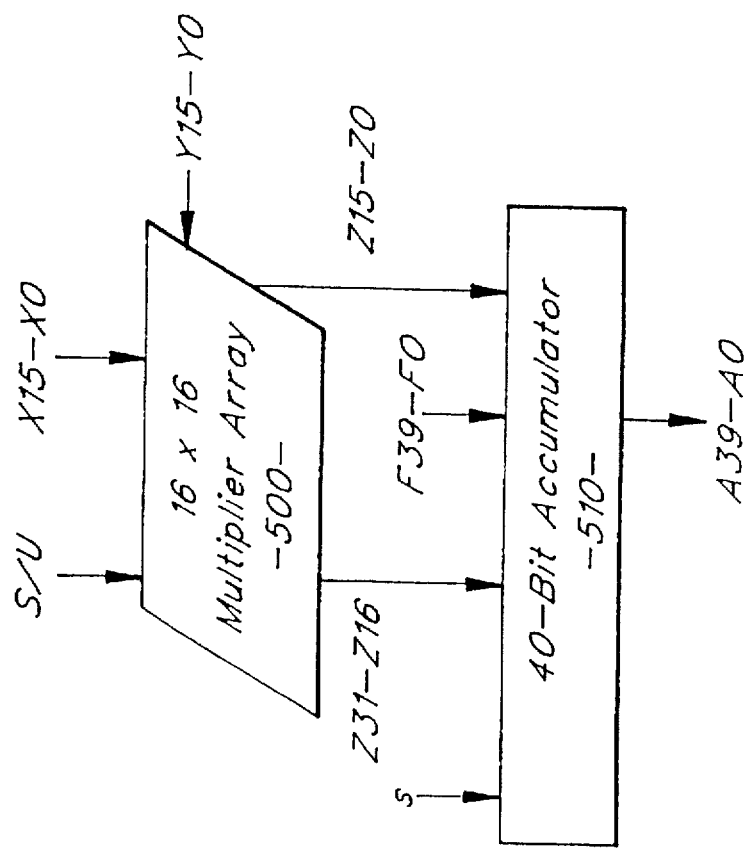

FIG. 6a is a simplified diagram of a conventional multiplier accumulator (MAC).

Figure 6B:
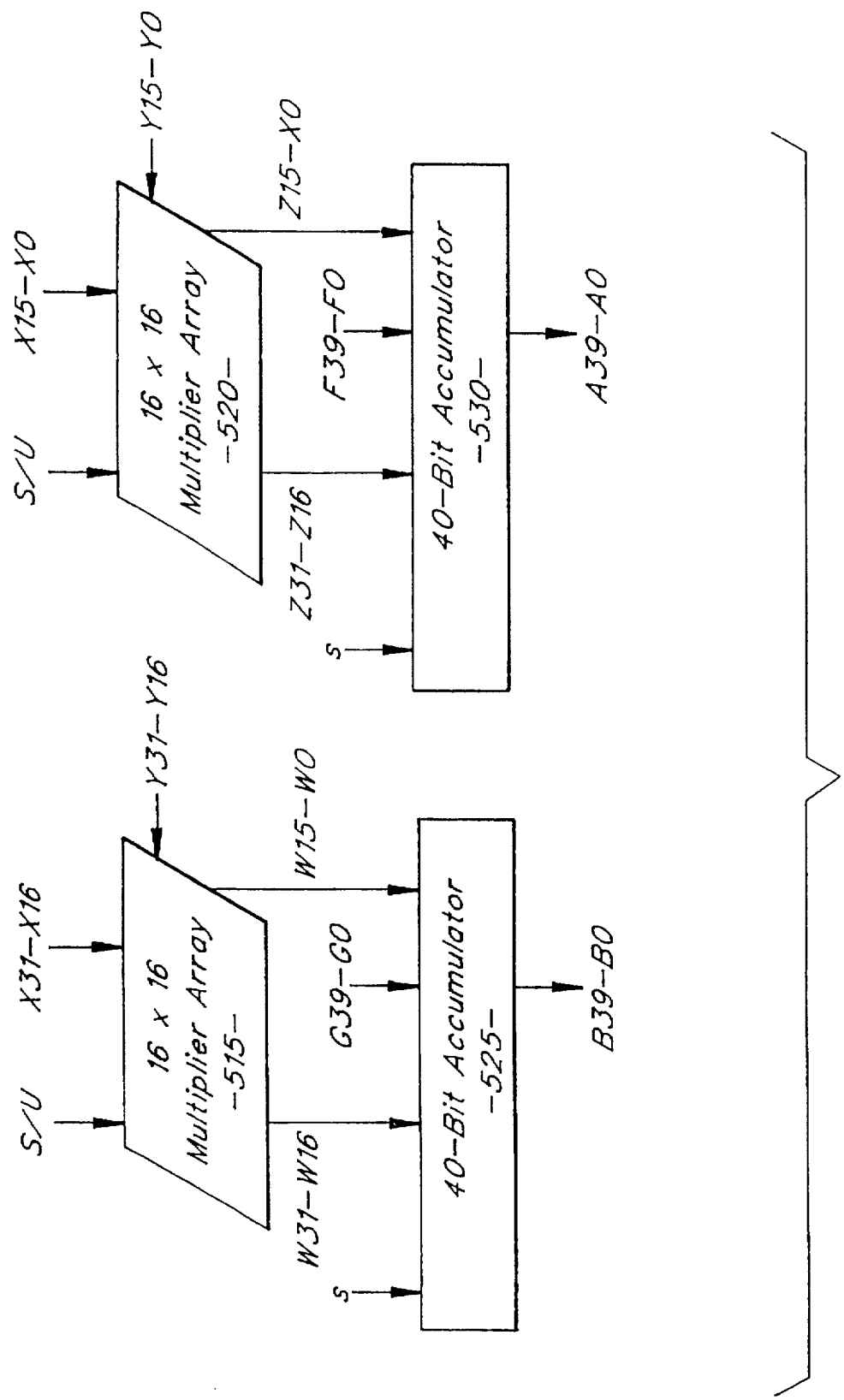

FIG. 6b illustrates how a MAC can incorporate the present invention.

Figure 7A:
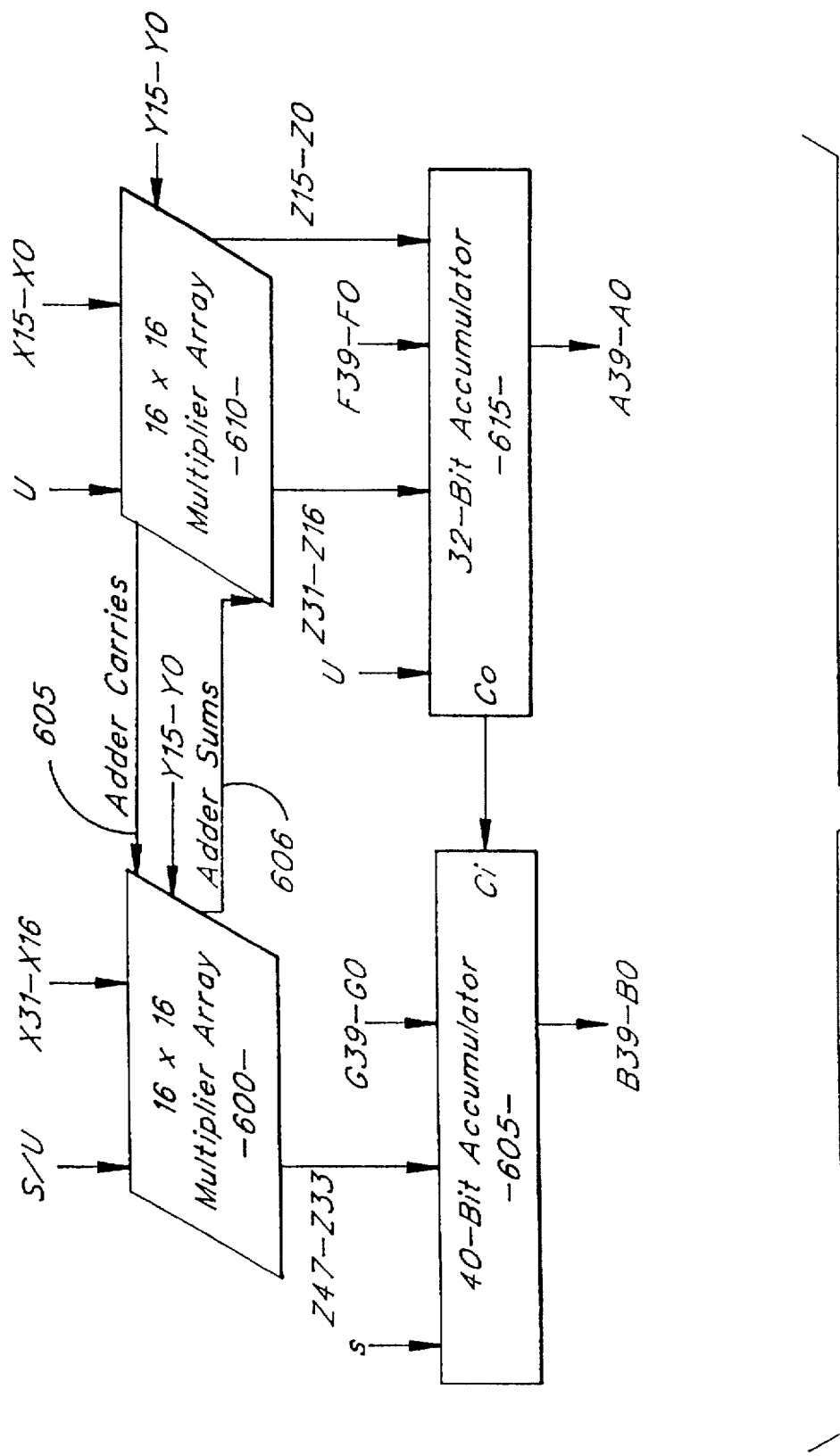

FIG. 7a illustrates how a MAC can incorporate the present invention for a 32×16 mode.

Figure 7B:
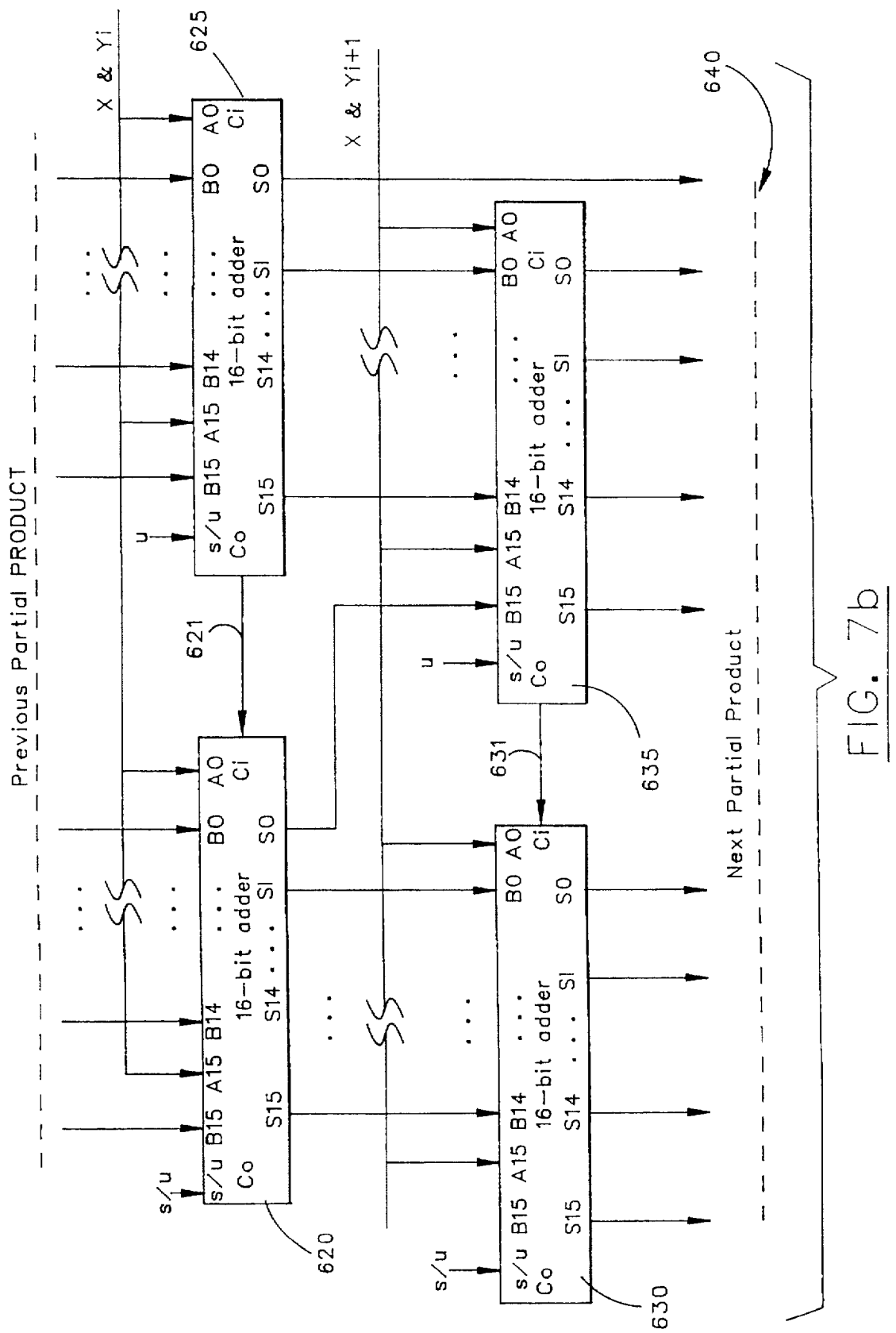

FIG. 7b illustrates the interconnections within a MAC for the 32×16 mode.

Figure 8:
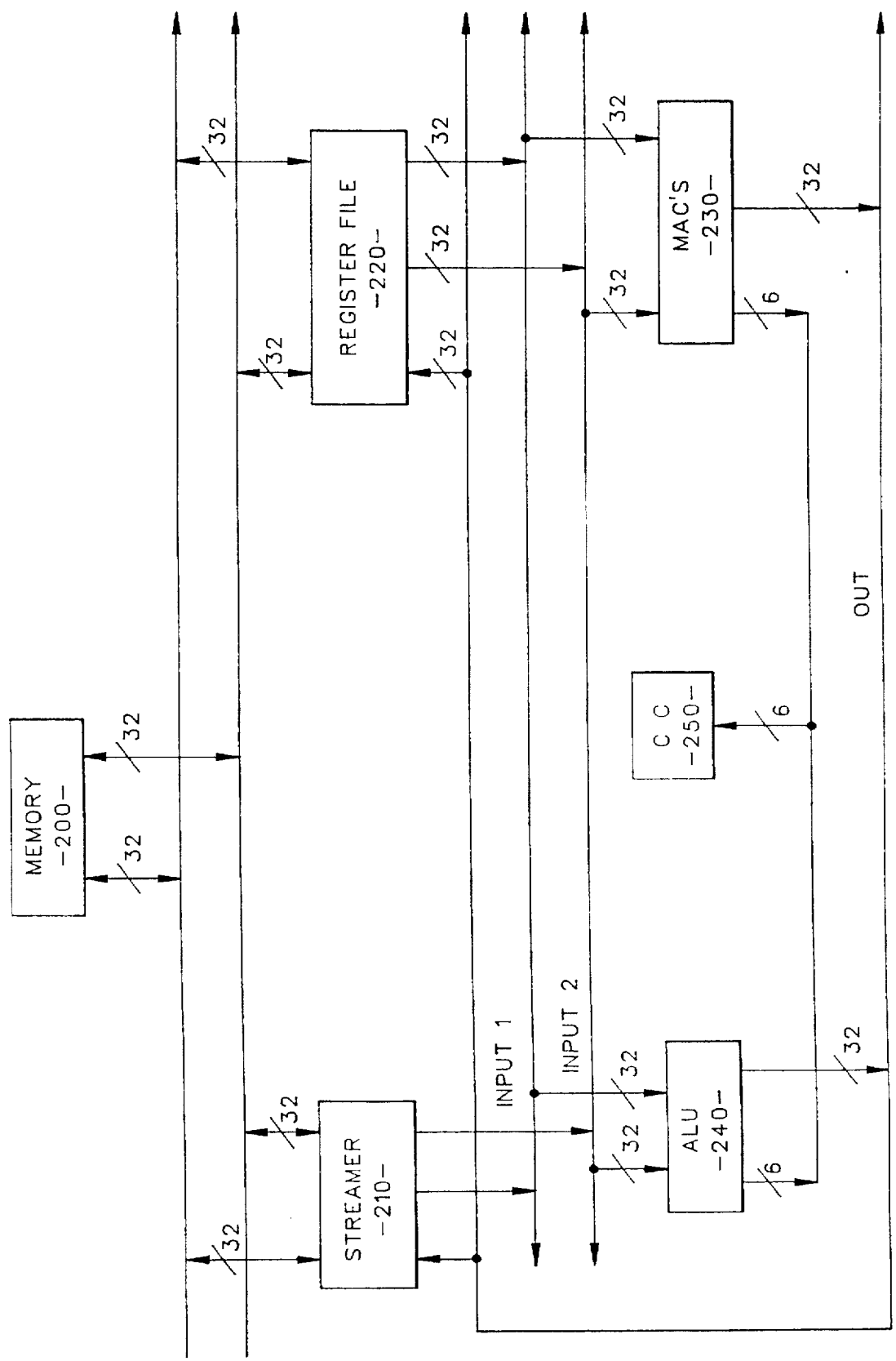

FIG. 8 is a simplified functional diagram of a processing element incorporating the present invention.

Figure 9:
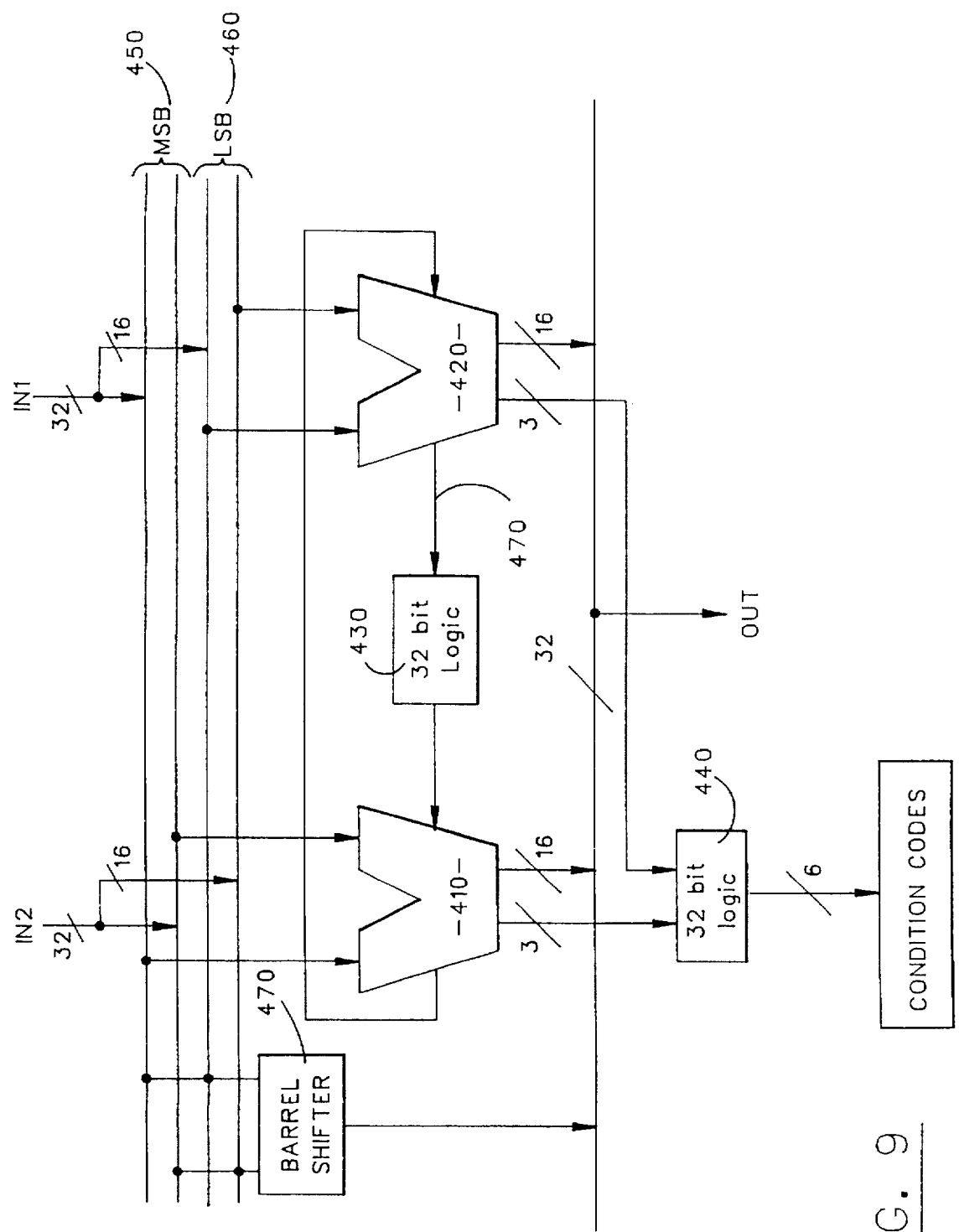

FIG. 9 illustrates a simplified diagram of ALU and shifter incorporating the present invention.

Figure 10:
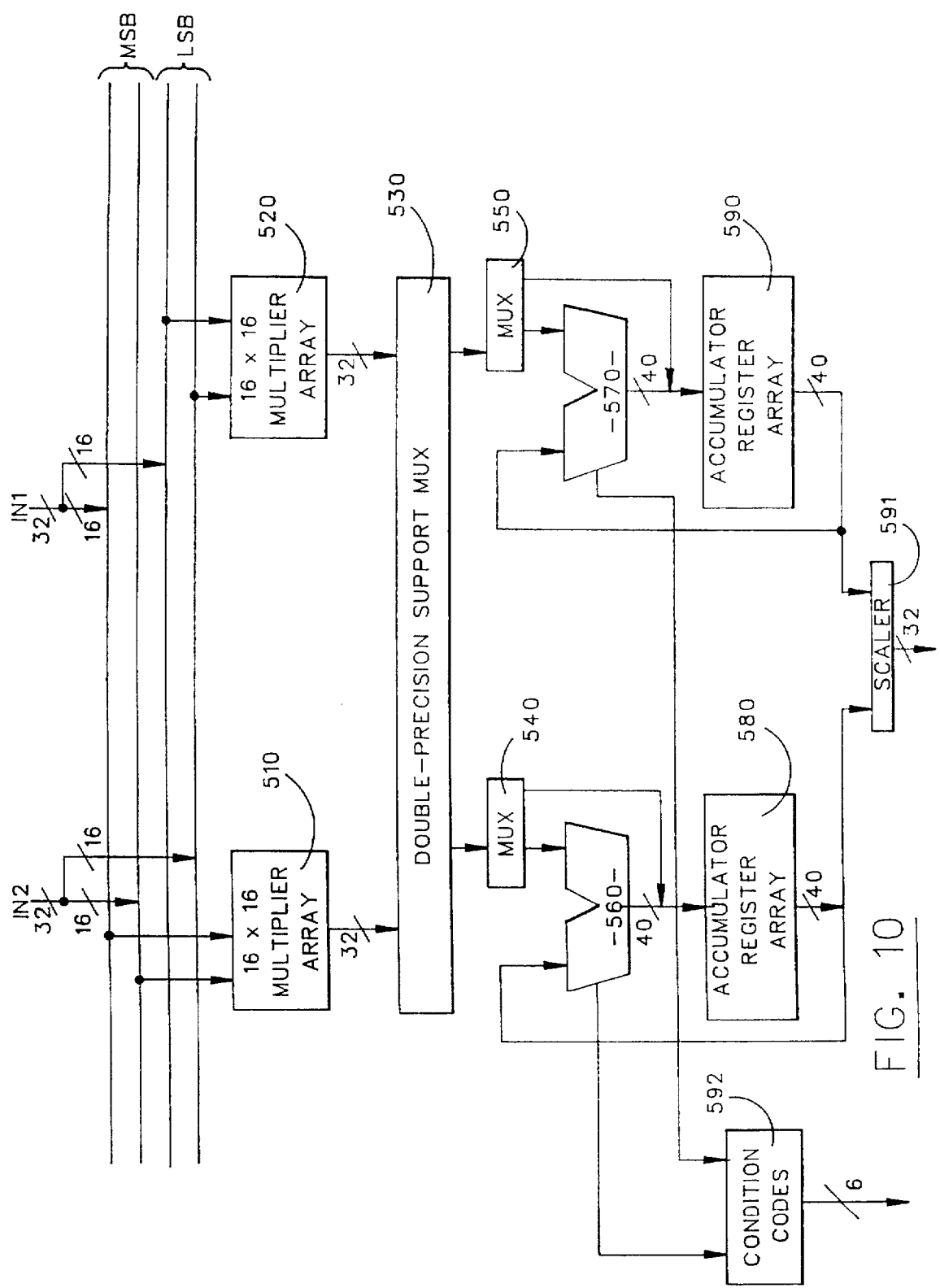

FIG. 10 illustrates a dual-MAC arrangement.

FIG. 11 shows the layout of an accumulator register file.

FIG. 12 shows the corresponding accumulator addresses.

FIGS. 13 through 16 shows the scaling of source operands and of results for multiplication operations.

Figure 17:
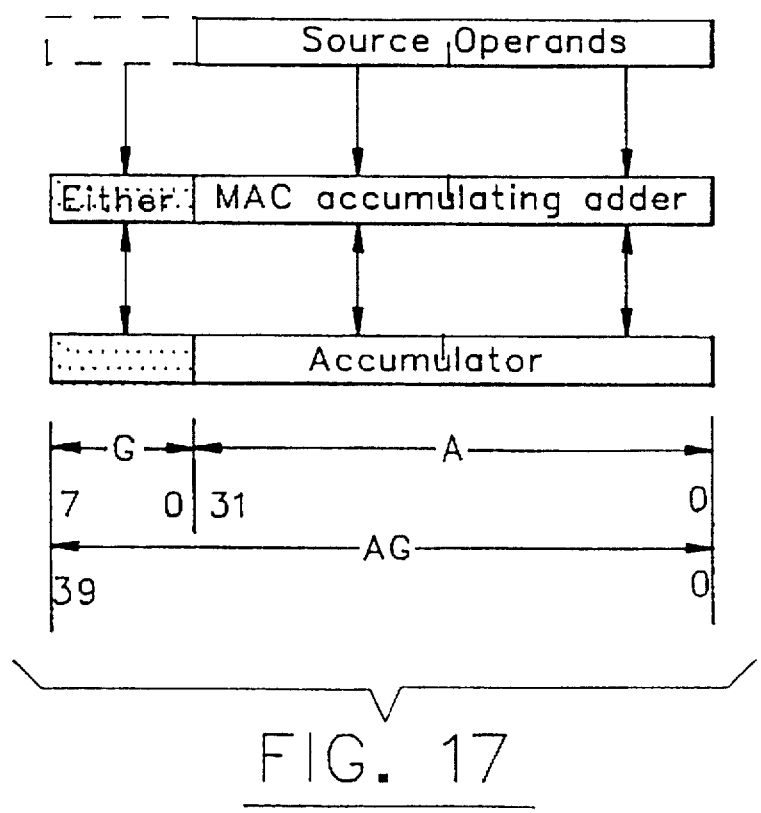

FIG. 17 shows a word or accumulator operand being added to an accumulator register.

Figure 18:
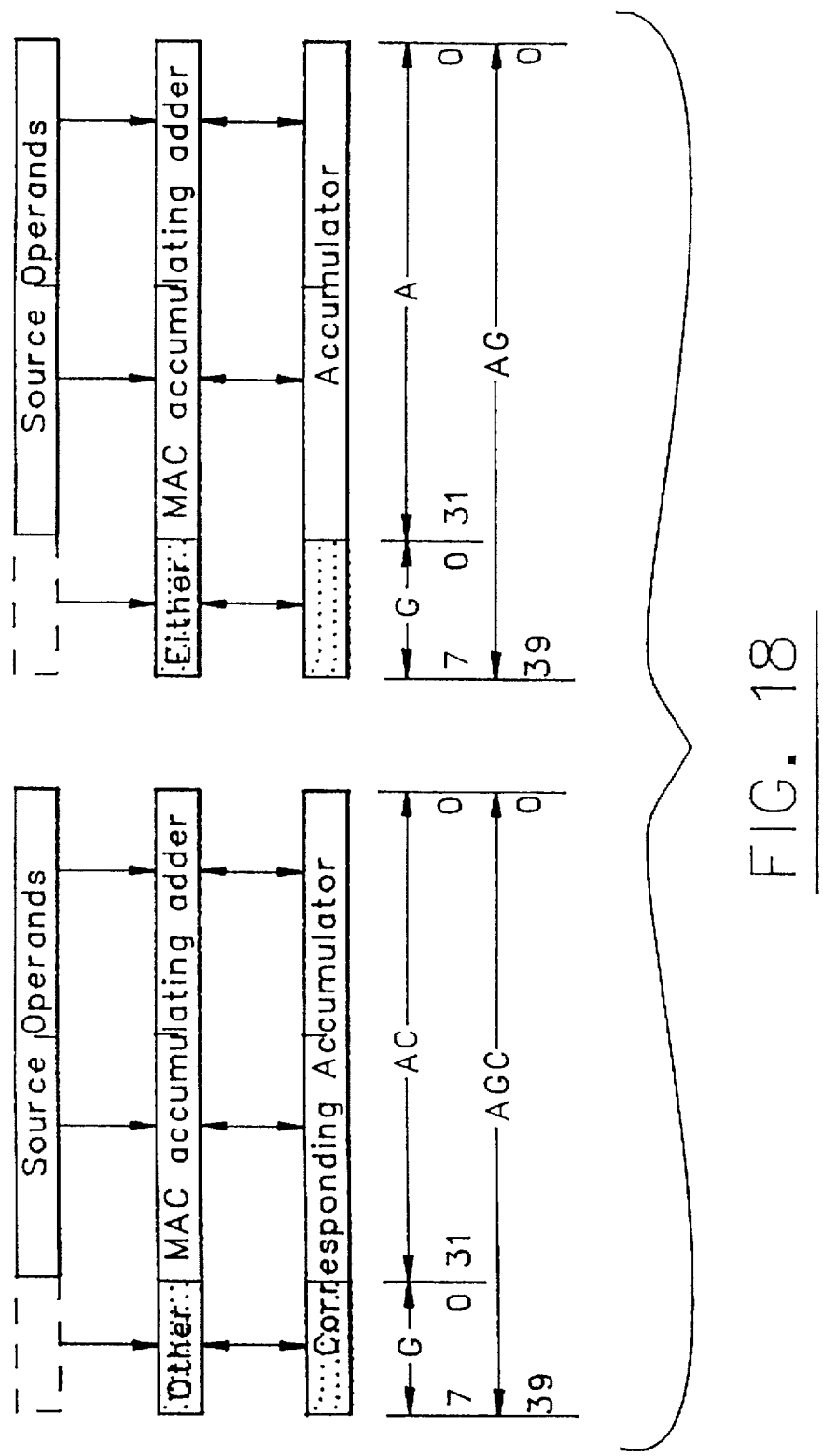

FIG. 18 shows a halfword pair operand being added to a halfword pair in accumulating registers.

Figure 19:
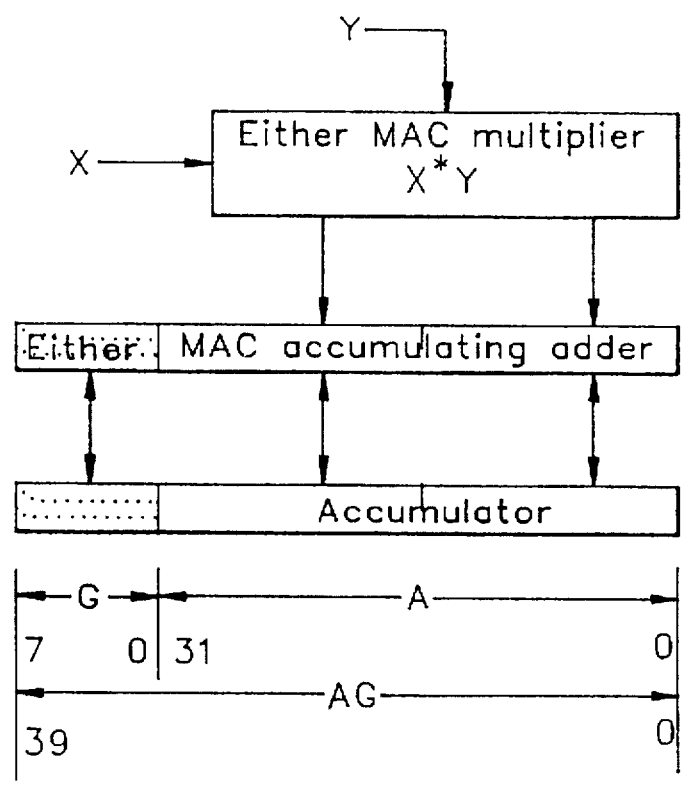

FIG. 19 shows a product being added to an accumulating register.

Figure 20:
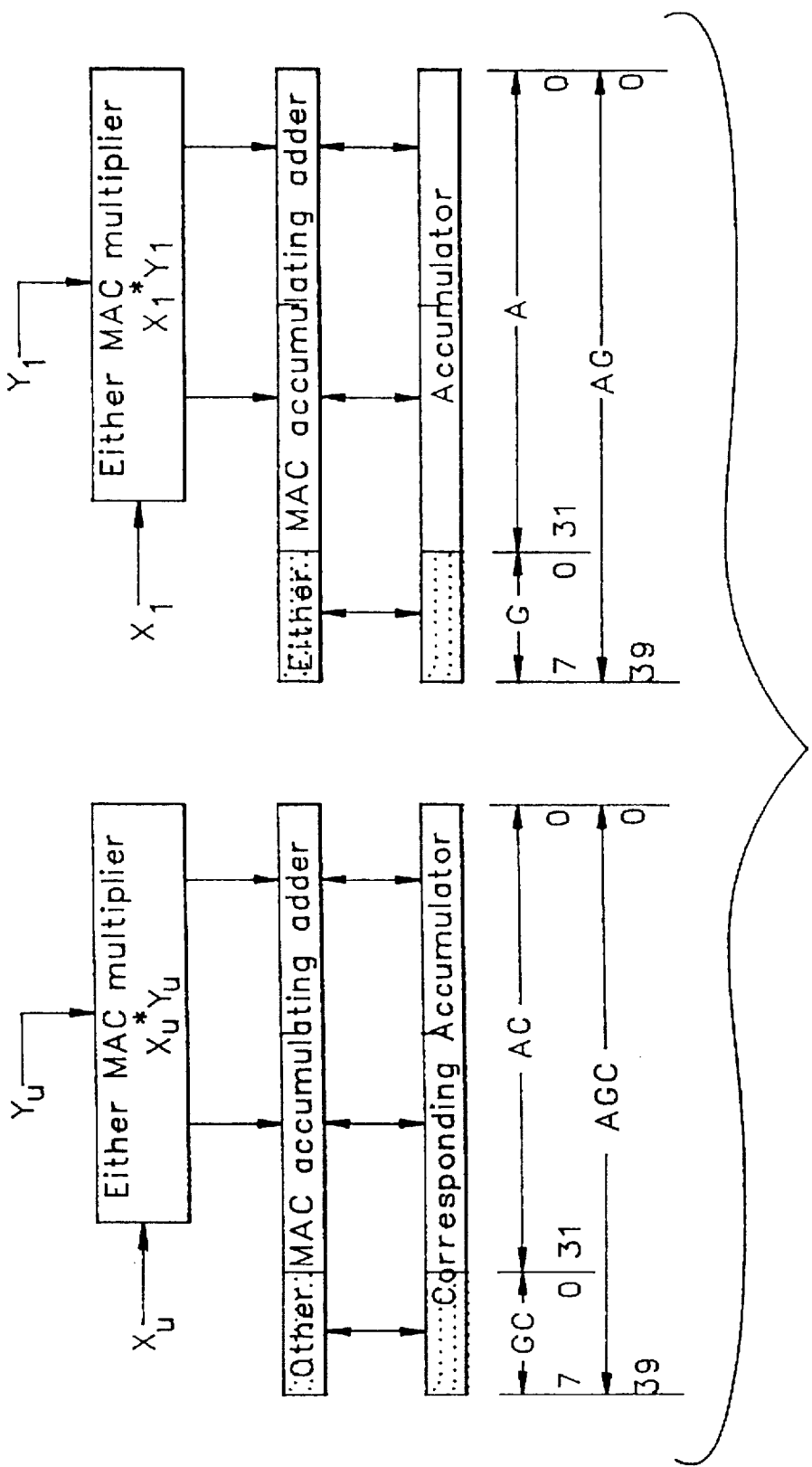

FIG. 20 shows a halfword pair product being added to a halfword pair in accumulating registers.

Figure 21:
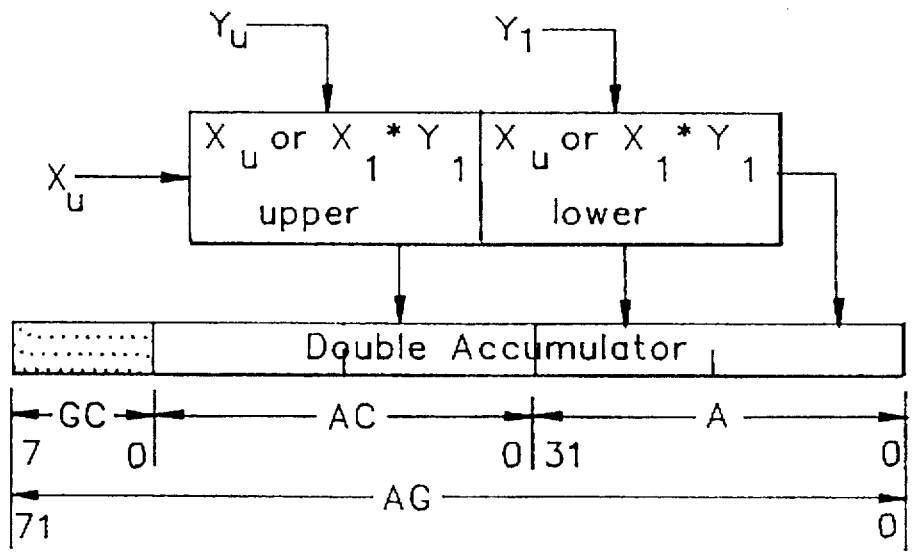

FIG. 21 shows a 48 bit product being accumulated using the justifying right option.

Figure 22:
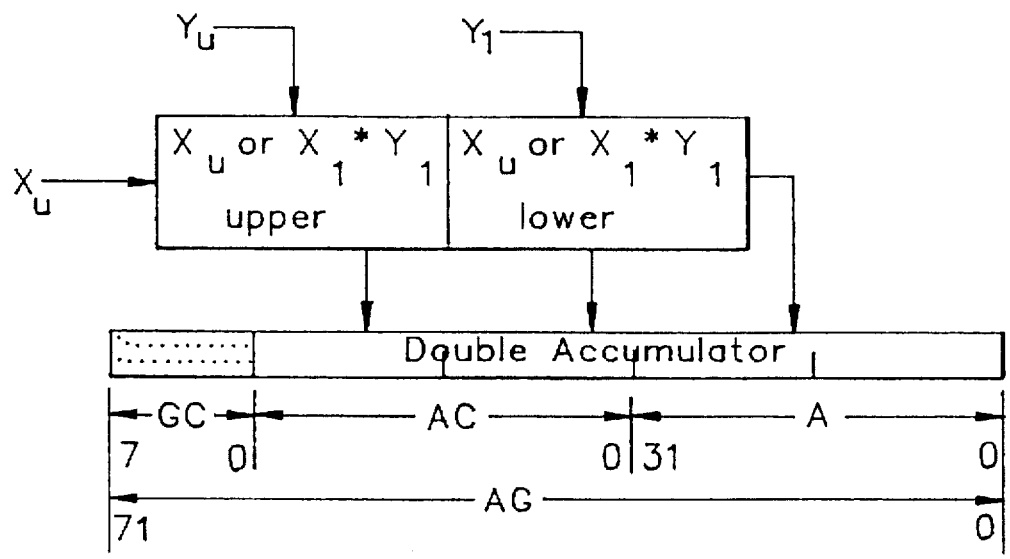

FIG. 22 shows a 48 bit product being accumulated using the justify left option.

FIG. 23 is a summary of instructions which may be implemented in accordance with the present invention.

DETAILED DESCRIPTION OF THE DRAWINGS

General Implementation Considerations

When integrating the SIMD scheme into a general-purpose machine, several issues should desirably be considered:

1) Selection of scalar or vector operation should preferably be done on an instruction-by-instruction basis, as opposed to switching to a vector mode for a period of time, because some algorithms are not easily vectorized with a large vector size. Also, when a vector operation is selected, the vector dimension must be specified.

Currently, in accordance with the present invention, the information on scalar/vector is specified by a Data Type qualifier field in each instruction that has the SIMD capability. For example, the instruction may feature a 1-bit "path" qualifier field that can specify Word or Halfword Pair operations. Further, this field should preferably be combined with the Data Type Conversion field in the Streamer Context Registers to select larger vector dimensions, e.g. 4, 8, etc. The complete description of a Streamer is disclosed in a related U.S. patent application filed on Jul. 23, 1992, Ser. No. 917,872, entitled STREAMER FOR RISC DIGITAL SIGNAL PROCESSOR, now abandoned the disclosure of which is now incorporated by reference.

2) The machine should provide for conditional execution based on vector result. It is important to be able to test the results of an SIMD operation just as though it were performed using multiple scalar operations. For this reason, it is preferred that Condition Code Flags in the Status Register be duplicated such that there is one set per segment of the Data Path. For example, a vector dimension of 4 would require 4 sets of Condition Codes.

4

Also, Conditional instructions need to specify which set of Condition Codes to use. It is useful to be able to test combinations of conditions, e.g. "if any Carry Flags set", or "if all Carry Flags set."

3) The SIMD scheme should be applicable to as many operations as possible. Although the following preferred embodiment of the present invention illustrates a machine in its current implementation such as 16-bit multiplier and 32-bit input data, it would be appreciated by those skilled in the art that other variations can readily be constructed in accordance with the present invention.

The following operations are examples of possible operations (to be listed in FIG. 23) which can increase performance of Space Vector (SV) techniques:

ABS, NEG, NOT, PAR, REV
ADD, SUB, SUBR, ASC, MIN, MAX, Tcond
SBIT, CBIT, IBIT, TBZ, TBNZ
ACC, ACCN, MUL, MAC, MACN, UMUL, UMAC
AND, ANDN, OR, XOR, XORC
SHR, SHL, SHRA, SHRC, ROR, ROL
Bcond
LOAD, STORE, MOVE, Mcond, where cond may be: CC, CS, VC, VS, ZC and ZS.

4) Memory data bandwidth should be able to match SIMD Data Path performance.

It is desirable to match the memory and bus bandwidth to the data requirements of a space vector data path without increasing the hardware complexity. The currently implemented machine's two 32-bit buses with dual access 32-bit memories are well matched to the 32-bit Arithmetic Logic Unit (ALU) and dual 16×16 Multiply/Accumulated Units (MAC's). They would also be well matched to quad 8×8 MACs.

5) Any addition and modification implemented should be cost-effective by maximizing performance with minimum additional hardware complexity.

An adder/subtracter can be made to operate in space vector mode by breaking the carry propagation and duplicating the condition code logic.

A shifter can be made to operate in space vector mode by also reconfiguring the wrap-around logic and duplicating the condition code logic.

A bit-wise logic unit can be made to operate in space vector mode by just duplicating the condition code logic.

Space vector conditional move operations can be achieved by using the vector of Condition Code Flags to control a multiplexer, so that each element of the vector is moved independently.

Space vector multiply requires duplication of the multiplier array and combination of partial products: e.g. 4 16×8 multipliers with appropriate combination logic can be used to perform 4 16×8 or 2 16×16 vector operations, or 1 32×16 scalar operation. Space vector multiply-accumulate operations also require accumulating adders that can break the carry propagation and duplicate the condition code logic as well as vectorized accumulator registers.

6) Programming complexity due to space vector implementation in the general-purpose computer should be minimized. Instructions can be devised to combine space vector results into a scalar result:

ACC Az, Ax, Ay Add accumulators;

SA Ay, Mz Store scaled accumulator pair to memory;

MAR Rz, Ax Move scaled accumulator pair to register.

7) When a vector crosses a physical memory boundary, access to the vector should still be possible. Some algorithms such as convolutions involve incrementing through data arrays. When the arrays are treated as vectors of length N, it is possible that a vector resides partially in one physical memory location and partially in an adjacent physical memory location. To maintain performance on such space vector operations, it is preferable to design the memories to accommodate data accesses that cross physical boundaries, or to use a Streamer as described in the above-mentioned U.S. patent application, STREAMER FOR RISC DIGITAL SIGNAL PROCESSOR.

The Overall System

Figure 1A:
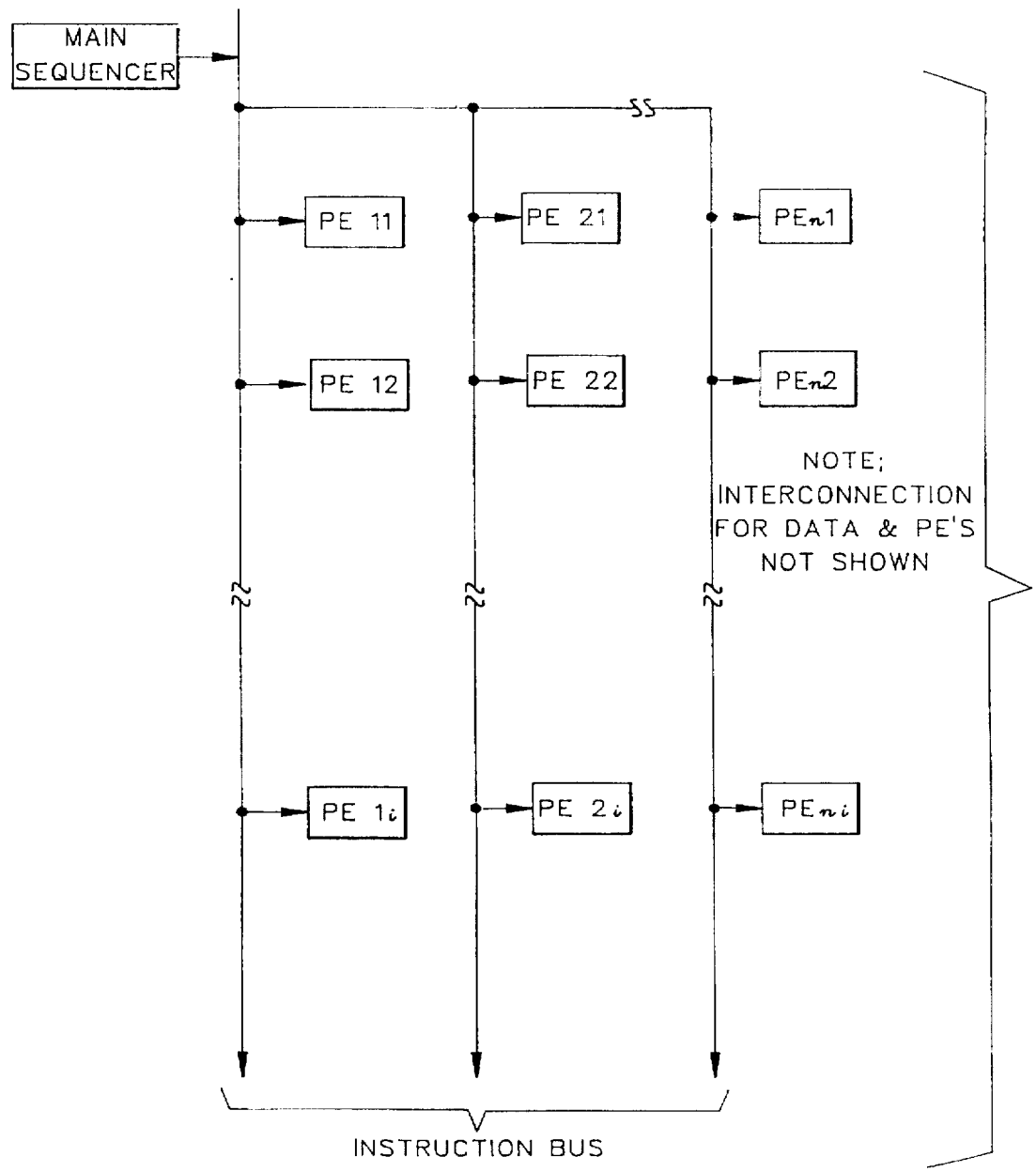
FIG. 1a is a conceptual diagram of a conventional single-instruction, multiple-data (SIMD) computer.
Figure 1B:
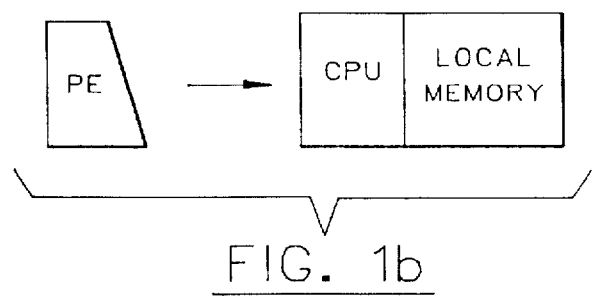
FIG. 1b is a simplified diagram of a processing element used in the SIMD computer.
Figure 2:
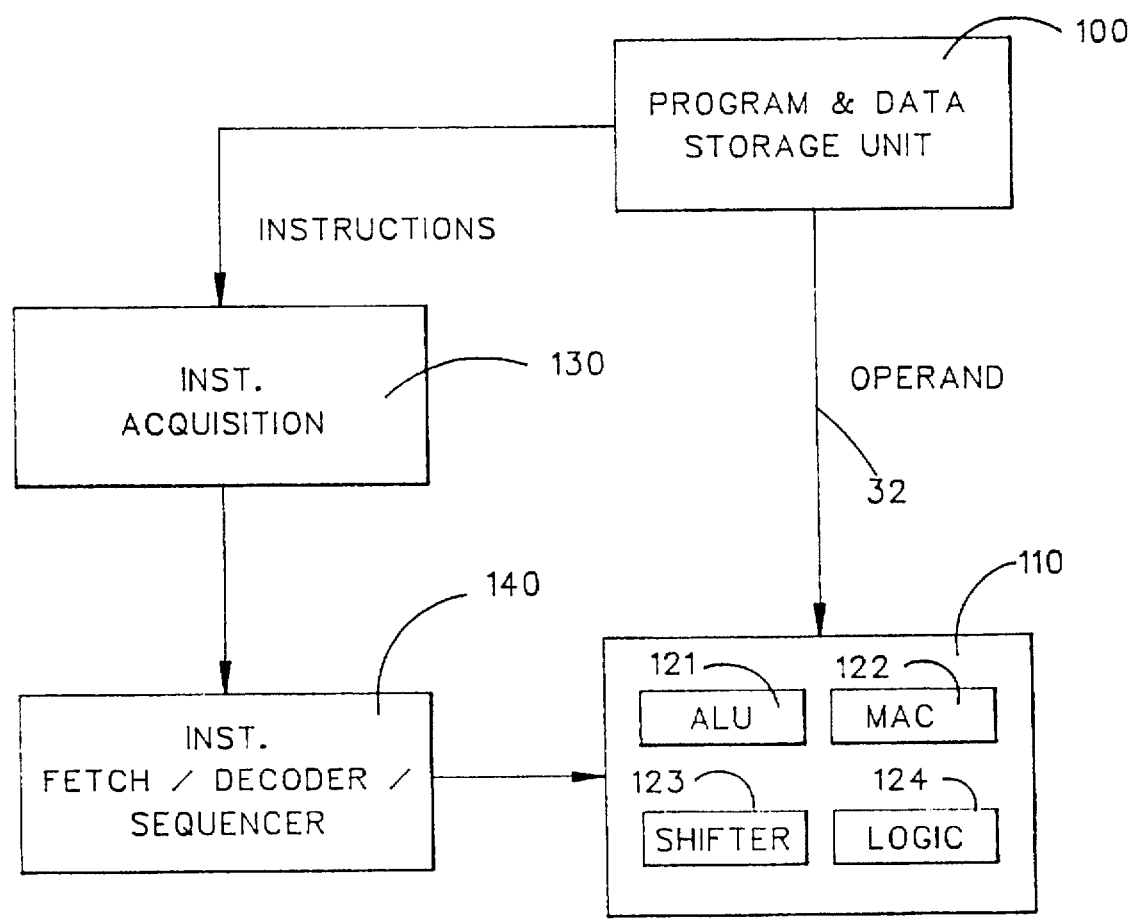
FIG. 2 is a generalized diagram of a programmable processor which may incorporate the present invention.

FIG. 2 is a generalized representation of a programmable processor which may incorporate the space vector data path of the present invention. One of the concepts embedded in the present invention is that one can modify a computer which is designed to work with the elements of scalar operands, or arrays, one at a time so as to increase its performance by allowing more than one operand to be processed at the same time.

What is shown in FIG. 2 is a programmable processor, or "computer" in a broad sense, which has a program and data storage unit 100 for storing programs and data operands. An instruction acquisition unit 130 fetches instructions from the storage unit 100 for an instruction fetch/decode/sequence unit 140 to decode and interpret for a processing unit 110 to execute. The processing unit 110 thus executes an instruction with operand(s) supplied from the storage unit 100.

To achieve increased performance, there are bits within each instruction to specify whether the operands are scalars or vectors. Also, if they are vectors, how many elements are in each operand. That information, along with the typical decoded instruction, is sent to the processing unit 110 so the processing unit 110 "knows" whether to process the operands as scalars or as vectors.

The processing unit 110 may be an ALU, shifters or MAC. The storage unit 100 may generally be some kind of memory, whether it be a register file, a semiconductor memory, a magnetic memory or any of a number of kinds of memory, and the processing unit 110 may perform typical operations like add, subtract, logical AND, logical OR, shifting as in a barrel shifter, multiply, accumulate, and multiply and accumulate typically found in digital signal processors. The processing unit 110 will take operands either as one operand used in an instruction, two operands used in an instruction or more. The processing unit 110 may then perform operations with those operands to achieve their results. By starting with scalar or vector operands, the operands go through the operations and come out with scalar or vector results, respectively.

The next step is to identify more specifically how the processing unit 110 may be formed and how it functions. While data and program are shown as combined in storage unit 100, it would be apparent that they can either be combined in the same physical memory or they can be implemented in separate physical memories. Although each operand is described as having a typical length of 32 bits, in general, the operand could be any of a number of lengths. It could be a 16-bit machine, an 8-bit machine or a 64-bit machine, etc. Those skilled in the art will recognize that the general approach is that an N-bit operand could be thought of as multiple operands that taken together add up to N-bits. Therefore a 32-bit word could, for instance, be two 16-bit half-words, or four 8-bit quarter words or bytes. In our current implementation, we have each of the elements in an operand being of the same width. However, one could have the 32-bit operand with one element being 24 bits and the other element being 8 bits. The benefit derived from using multiple data paths and multiple elements in an operand is that it is processing all of the elements independently and concurrently to achieve a multiplication of processing throughput.

The instructions may be of any size. Currently 32-bit instructions are used; however those skilled in the art may find particularly utility in 8 bits, 16 bits, 32 bits and 64 bits. More importantly, it does not even have to be a fixed-length for the instructions. The same concept would work if used in variable-length instruction machines, such as those with 16-bit instructions that can be extended to 32-bit instructions, or where the instructions are formed by some number of 8-bit bytes, where the number depends on what specific instruction it is.

The processing unit 110 may typically include an ALU 121 and/or a MAC 122. It may also only implement a shifter 123 or a logic unit 124.

Adder

Figure 3A:
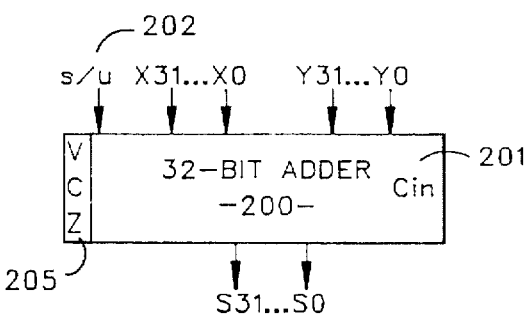
FIG. 3a is a symbolic diagram of a conventional adder which may be incorporated in the ALU for the processing unit.
Figure 3B:
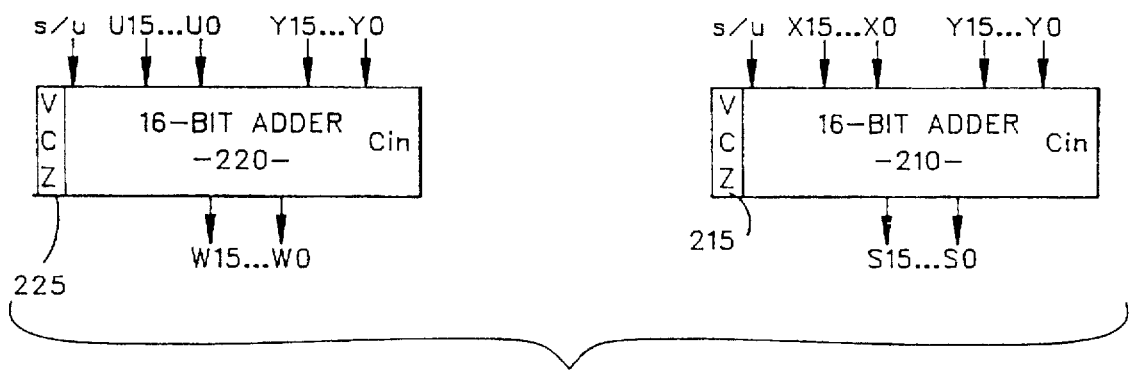
FIGS. 3b and 3c are symbolic diagrams of adders which may implement the present invention.
Figure 3C:
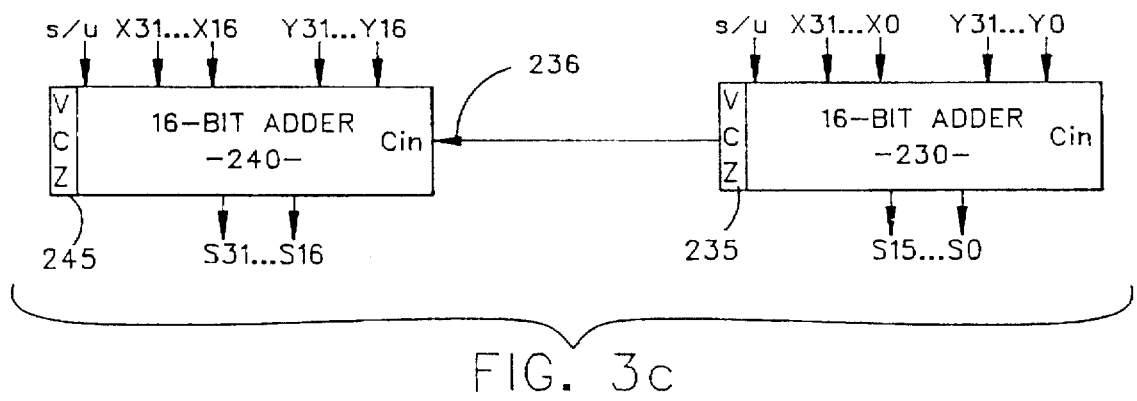

FIG. 3 is a symbolic representation of an adder which may be implemented in the ALU for the processing unit (110, FIG. 2). FIG. 3a illustrates a conventional 32-bit adder. FIG. 3b is a representation of two 16-bit adders connected for half-word pair mode. FIG. 3c is a representation of two 16-bit adders connected for word mode.

FIGS. 3a–c serve to illustrate how the typical hardware in a 32-bit conventional machine in FIG. 3a may be modified to achieve the desired objectives of the half-word pair mode or the word mode in accordance with the present invention. A vector is illustrated here as having two elements. More specifically, it is shown how a 32-bit conventional operand can be broken down into two elements with 16-bits each. The same principle could apply to breaking it down into a number of elements with the elements of equal length or unequal length.

Referring to FIG. 3a, a conventional adder 200 has inputs X for X operand and Y for Y operand. It also has an input for a carry-in 201 and condition codes 205 that are typically found associated with an adder. The condition codes 205 may be: V for overflow, C for carry-out and Z for a zero result, i.e. the result out of the adder being zero. It further has the result operand out of the adder being S. X, Y and S are all represented as 32-bit words. A control input S/U 202 represents sign or unsigned operands, where the most significant bit indicates where the number is positive or negative, or an unsigned operand, where the most significant bit participates in the magnitude of the operand.

FIG. 3b shows how two adders which are similar to the typical 32-bit adder, but instead are only 16-bit adders, can be combined together to perform the vector operation on a half-word pair, i.e. two half-word elements per operand. The Y operand is now split off as two half-word operands: a lower half, Y0 through Y15, and an upper half, V0 through V15. Similarly the X operand is split off as two half-word operands: a lower half, X0 through X15, and an upper half U0 through U15. The result S is identified as S0 through S15 coming from the adder 210 and the upper half W0 through W15 coming from adder 220. Essentially, the 32-bit adder 200 may be divided in the middle to form the two 16-bit adders 210, 220. However, the most significant bits would need logic to determine the nature of the sign bit of the operands. Thus, in dividing the 32-bit adder 200, added logic would be required for sign control of the lower 16 bits that are split off of the 32-bit adder to form adder 210. Then these two adders 210 and 220 may become identical except that the input operands for the adder 210 come from the lower half of the 32-bit operand and the input operands for the 16-bit adder 220 come from the upper half of the 32-bit operands.

When the operand elements X and U are separately added together with Y and V, respectively, they yield results S and W, respectively. They also produce independent condition codes for each one of the adders. Adder 210 produces condition codes 215, and adder 220 produces condition codes 225 and these condition codes apply to the particular half-word adder that they are associated with. Therefore, this shows how the conventional 32-bit adder could be modified slightly to perform independent half-word pair operations.

Referring to FIG. 3c, the same adder units in FIG. 3b may be reconnected to perform the original word operation that was performed in the adder 200 of FIG. 3a. This is where the operands represent 32-bit scalars. The scalars are Y0 through Y31 and X0 through X31. The lower half of those operands are processed by the adder 230 and the upper half are processed by the adder 240. The mechanism which allows this to be done is by connecting the carry-out of the adder 230 to the carry-in 236 of the adder 240. As shown in FIG. 2c, the combined two 16-bit adders perform the same function as one 32-bit adder in FIG. 3a. Therefore, the implementation shown in FIGS. 3b and 3c adder 210 may essentially be the same as adder 230, while adder 220 may be the same as adder 240. While the description shows how those two adders can function in either a half-word pair mode or a word mode, one skilled in the art may, by extension, modify a conventional adder into several adders for handling independent elements of a vector concurrently, as well as reconnected the same to perform the scalar operation on a scalar operand.

One note should be made to the adder of FIG. 3. In FIG. 3c, two sets of condition codes 235 and 245 were shown. While in the original conventional adder, there was only one set of condition codes 205. The condition codes in FIG. 3c are really the condition codes of 245 except for the condition code Z. The condition codes in 235, the overflow V and carry C, are ignored as far as condition codes go and the condition code Z in the condition codes 205 is effectively the Z condition code of 245 ANDed with the Z condition code of 235. Now the condition code V of 205 corresponds to the V of 245. The C of 205 corresponds to the C of 245 and the Z of 205 corresponds to the Z of codes 245 ANDed with the Z of codes 235. Those skilled in the art will be able to combine those in any particular way they see fit.

Logic Unit

FIGS. 4a–4c are a symbolic representation of a logic unit which may be implemented in accordance with the present invention. FIG. 4a shows a typical 32-bit logic unit performing the logic operations of bitwise, bitwise-complement or a number of combinations typically found in current processors. What may be significant about these operations is that they work independently for the different bits of the condition code. Overflow bit normally has no significance in the condition code in 305. While the carry-out has no significance in the logic operations, zero still has significance in indicating that the result is zero. For the half-word pair operations, the original 32-bit adder would be "operationally" divided into two 16-bit logic units. The upper 16 bits 320 and the lower 16 bits 310 in the input operands would be broken into two half-words in the same manner that they were for the adder. In processing the logic operations, because the bits are generally processed independently, there is no operational connection between the two logic units 310 and 320.

FIG. 4c shows the logic units again re-connected to form a typical logic unit for scalar processing. Note that there is no connection needed between the units except in the condition code area. The zero condition code 305 of conventional logic unit now may be represented by ANDing the zero condition code of unit 345 with the zero condition code of unit 335. Thus, it should be apparent to those skilled in the art that the dual-mode logic unit can be constructed by extending the concept and implementation of a dual-mode adder as previously described.

Shifter

Figure 5A:
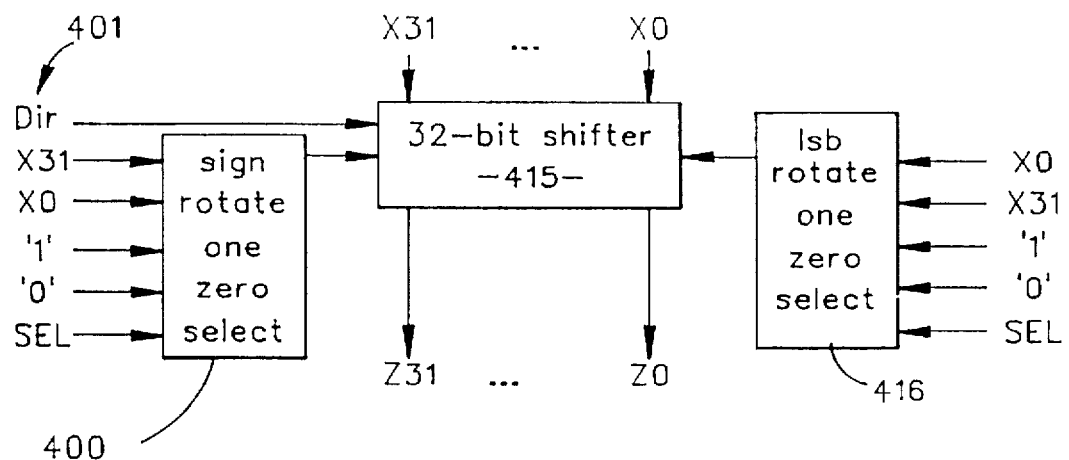
FIGS. 5a and 5b are symbolic diagrams of a conventional shifter which may implement the present invention.
Figure 5B:
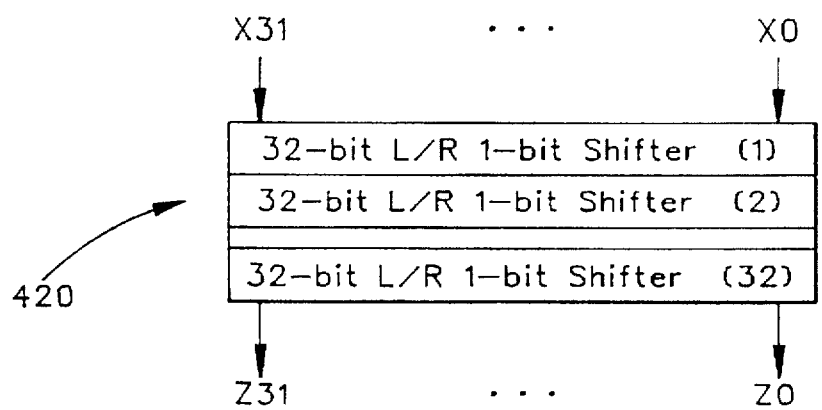
Figure 5C:
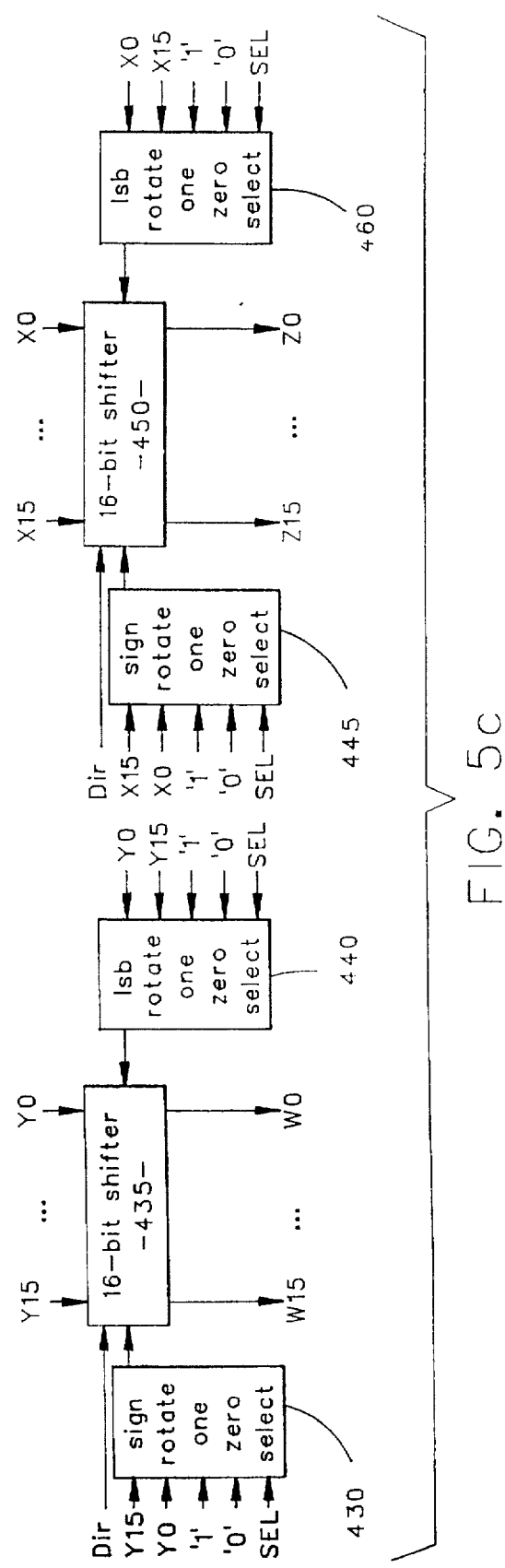

FIG. 5 is a symbolic representation of a barrel shifter which may be implemented in accordance with the present invention. While some processors have barrel shifters as shown in FIG. 5b, others have single-bit shifters shown in FIGS. 5a, 5c, and 5d. The barrel shifter is typically not required in the processor unit, but for high performance machines, the processor unit may implement a shift unit as represented in FIG. 5b. The following description will illustrate how shifters may be constructed and implemented by those skilled in the art to speed up the processing or to minimize the amount of hardware involved. FIG. 5a shows how a one-bit shift, either a left shift or a right shift, may be implemented in a typical processor. Shifter 415 can cause a 32-bit input operand X to be shifted either left or right one bit or not shifted under the control of the direction input DIR 401 and produce the Z output. When the shift occurs, if it is a shift to the left, then a bit has to be entered into the least significant bit position by the selection box 416.

When the shifter is shifted to the right, a bit from the selection box 400 is entered into the most significant bit position. Selection boxes 400 and 416 have a number of inputs that can be selected for entering into the shifter 415. There is also a select input in both boxes labeled SEL, which comes from the instruction and is typical of a conventional machine. The SEL would determine which of these input bits would be selected for entering into the shifter. In general, because of these selections boxes, the shift can be a rotate, where the bit that is shifted out of the shifter is shifted in at the other end of the shifter, or an arithmetic right shift, where the sign bit, or the most significant bit, is dragged as the other bits are shifted to the right or an arithmetic left shift where zero is entered as the other bits are shifted to the left. And for a logical shift, a "0" is entered in as the bit. Also, a "1" may be entered in as the new bit entered in a logical shift.

One skilled in the art, by reference to the description of condition codes for the adders and logic units, could easily assign condition codes to the shifter to represent the overflow for an arithmetic left shift operation, a carry to retain the last bit of the shift operation, and a zero flag to record when the result of the shift was a zero value.

Using the shifter of FIG. 5a in combination, the shifter of FIG. 5b may be formed as a 32-bit left/right barrel shifter. This may be done by combining 32 of the shifters in FIG. 5a and cascading them one after another, where the output of the first goes into the input of the second and so on throughout. The number of bits to be shifted is determined by the pattern of ones and zeros of the direction input DIR's to the individual shifters. Note that in FIG. 5a, the direction for the shifter is three-valued: it is either left, right, or straight ahead with no shift being accomplished. As such, in FIG. 5b, the direction input to the individual 32-bit one-bit shifters can be either left or right or no shift. If 32 bits are to shift to the left, then all of the direction inputs would indicate to the left.

If only one bit is to shift to the left then the first box would indicate a one bit shift to the left and all of the other 31 would indicate no shift. If N bits are to shift to the left, the first N boxes would have a direction input of one bit to the left and the remaining boxes would indicate no shift. The same thing could be applied to shifts to the right, where the direction would now either indicate a shift to the right, or no shift, and would be able to shift from no bits to 32 bits in a right shift in the same way.

Now this typical 1-bit shifter in FIG. 5a can be divided into two 16-bit shifters with reference to FIG. 5c, where two 16-bit LIR 1-bit shifters connected for half-word pair mode is shown. The shifter 415 in FIG. 5a can be operationally divided down into two 16-bit 1-bit shifters 452 and 435. Each one of those 16-bit shifters then has the input selection logic- of 4a referring specifically to 416 and 400 duplicated so that box 450 has boxes 460 and 445, and box 435 has boxes 440 and 430. The input logic is the same but the inputs to the selection boxes are wired differently. It is therefore in the way the input selection boxes are wired that differentiates the shifter in FIG. 5c connected for half-word pair mode from the shifter in FIG. 5d connected for word mode. The input operand element in FIG. 5c for the lower shifter 450 is X0 through X15 and for shifter 435 is Y0 through Y15. X and Y thus designate the 2 half-words.

The result Z output operand is shown as the 2 half-words: the lower 16 bits being Z0 through Z15 and the upper 16 bits being W0 through W15. The input selectors are wired such that in a rotate, the bit which is output from the shifter will be fed back into the other end of the shifter. If shifter 435 does a left shift, the rotated bit would be Y15 and if it does a right shift, the rotated bit would be Y0. Similarly for shifter 450, if it were a left rotate, the input bit is X15 and if it is a right rotate, the input bit is X0. Similarly the selection works as in FIG. 5a for arithmetic shifts and logical shifts.

FIG. 5d shows how the operation of these same two shifters can be connected for a word mode, where the shift pattern works on the whole 32 bits of the operand as opposed to the two half-words in FIG. 5c. For a rotate left, the bit that is rotated out of the lower shifter 486 (the MSB bit X15)is rotated into the upper shifter 475 as the LSB bit input to the shifter 475. It forms a continuous shift between the upper 1-bit shifter and the lower 1-bit shifter. For a rotate around the two shifters, X31 would be shifted into X0. If all the inputs of selectors 480 are connected to X15 and all the inputs of selector 485 are connected to X16, as shown in FIG. 5d, the combined shifter in FIG. 5d effectively operates as the shifter in FIG. 5a. The input selector 470 will have the same pattern as the input selector 400. And the input selector 488 will have the same input pattern as the selector 416. Therefore, the combined shifter in FIG. 5d will perform the same shift operations for scalar operands as the shifter in FIG. 5a.

The 1-bit shifters in FIGS. 5c and 5d can further be extended into a 32-bit barrel shifter shown in FIG. 5e in a manner analogous to FIG. 5b by cascading 32 of the 1-bit shifters. If a 1-bit shift is desired, then the direction control signal is used on the first shifter to indicate a 1 bit-shift. And on the other cascaded 1-bit shifters, no shift is indicated. For N-bit shifts, the direction inputs in the first N 1-bit shifters will indicate to shift by one bit and the remaining 1 bit shifters do not shift but pass the data through.

Similarly this barrel shifter in FIG. 5e can perform either word or half-word pair mode operations, because the individual bit shifters are capable of performing either word or half-word pair operations. While this implementation in FIG. 5 is representative of one way of implementing a barrel shifter, the same concept of dividing the barrel shifter in the middle and providing input selection logic can be applied to many other implementations of barrel shifters. Those skilled in the art should be able to find an appropriate implementation, depending upon their specific hardware or throughput requirements.

Multiplier Accumulator

FIG. 6 is a symbolic representation of a multiply and accumulate (MAC) unit which may be implemented in accordance with the present invention.

A typical 32-bit processor normally would not require the implementation of a costly 32-by-32 multiplier array. A multiply would probably be built in another way. In typical 16-bit signal processors, however, it is quite common to find 16-by-16 multiplier arrays. The type of computation that requires fast multiply would typically use 16-bit data and consequently the 16-by-16 multiplier array has become more popular, even among some 32-bit processors. Therefore, by treating 32-bit operands as 2 16-bit half-word pairs, two 16-by-16 multiplier arrays can be implemented to take advantage of the space vector concept of 32-bit word operands, half-word operands or half-word elements in one vectorized operand.

The following example shows how a 16-by-16 multiplier array can be duplicated for use as two half-word pair multipliers, which may be connected together to form 32-by-16 scaler multiply. There is a usefulness in this 32-by-16 scalar multiply in that two of these multiplies taken together can be used to form a 32-by-32 bit multiply. Or the 32-by-16 multiply can be used by itself, where an operand of 32-bit precision may be multiplied by an operand of only 16-bit precision.

A MAC unit is not typically found in all processors. But in high performance processors for signal processing applications it is typically implemented. FIG. 6a shows a conventional implementation of a MAC unit. A MAC can be any of various sizes. This shows a unit which is 16 bits by 16 bits in the multiplier forming a 32-bit product. That 32-bit product may be added with a third operand in an accumulating adder which might be longer than the product due to extra most significant bits called "guard bits".

As shown in FIG. 6a, input operands are 16 bits, represented by X0 through X15 and Y0 through Y15. They generate a 32-bit product Z, which may be added to a feedback operand F. In this case, F is shown as F0 through F39 representing a 40-bit feedback word or operand. It is 40 bits because it would need 32 bits to hold a product, plus 8 additional bits for guard bits. The guard bits are included to handle overflows, because when a number of products are added together there can be overflows and the guard bits accumulate the overflows to preserve them. Typically the number of guard bits might be 4 or 8. The present example shows 8 bits and yet they could be of a number of sizes. The result of the accumulator is shown as a 40-bit result, A0 through A39.

It should be noted that the multiply array could be used without the accumulator, or it could be used with the accumulator. It should be noted that another input S/U meaning signed or unsigned indicates whether the input operands are to be treated as signed number or unsigned numbers. One skilled in the art would appreciate that the upper bits of the multiplier may be handled differently depending upon whether the input operands are signed or unsigned.

FIG. 6b shows how two of the typical 16-by-16 arrays can be formed in order to handle half-word pair operands. In this case, the 32-bit input operand X is broken down into two half-words. The lower half-word for multiplier 520 is X0 through X15 and the upper half-word for multiplier 515 is X16 through X31. The Y input operand is also broken down into two half-word operands. The lower half-word for multiplier 520 is Y0 through Y15 and the upper half of the operand for multiplier 515 is Y16 through Y31. FIG. 6b thus represents a connection for multiplying the half-word operands of the X operand with the half-word operands of the Y operand respectively. Note that the least significant half-word of X is multiplied by the least significant half word of Y in multiplier 520. And independently and concurrently in multiplier 515, the upper half-word of X is multiplied by the upper half-word of Y. These two multiplications create two products. The 32-bit product from multiplier 520 is represented by Z0 through Z31 and similarly the 32 bit result of multiplier 515 represented by W0 through W31. The two products are larger than 16 bits each in order to preserve its precision. At this point the product of the half-words are kept as independent operand representations.

The product from the lower half-words out of multiplier 520 is fed into accumulator 530 and added with a feedback register represented by F0 through F39. That forms an accumulated product A represented by A0 through A39. Similarly in the upper half-word product is represented by W0 through W31 and is added in accumulator 525 to a feedback register represented by G0 through G39 to form a 40-bit result B, represented by B0 through B39. These accumulator results in general would be kept as larger numbers in an accumulator as operands represented by larger numbers or bits to preserve the precision of the multiply.

The feedback bits would normally come from either memory (100 in FIG. 2) or special memory capable of storing a larger number of bits. While a typical memory location could handle 32 bits, the special memory, which is typically called an accumulator file, could store 40 bits for a scalar product, or 80 bits for a half-word pair product. In this case two accumulator registers capable of handling scalar operands may be used to form the storage for the half-word pair operand. In other words, two 40-bit accumulators could be used to store the two 40-bit results of the half-word pair operations.

MAC Interconnection

FIG. 7 shows how the two 16-bit multipliers of arrays of FIG. 6b could be interconnected in order to form a 16-by-32 bit multiplication for scalar operands. In this case the multiplier array is implemented as a series of adders. Carrys-out 605 of the least significant multiplier array 610 is fed as carry-inputs into the adders in the upper multiplier array 600. Also the sum bits 606 that are formed in the upper multiplier array 600 in the least significant end are fed into the adders in the lower multiplier array 610 at the most significant end.

Another connection takes place in the accumulators 615 and 605. The accumulator 615 representing the lower part of the product is limited to 32 bits and the upper 8 guard bits are not used. The carry-out of the 32 bits is fed into the carry-input of the upper 40-bit accumulator 605 and the result is a 72-bit operand shown here as A0 through B39. Typically this operand would be stored as two operands, the lower 32 bits being stored in one accumulator 615 and the upper 40 bits being stored in the second accumulator 605. Also in this operation, for the signed and unsigned bit, the least significant half of the input operand X is treated as an unsigned number in the multiplier 610, while the upper 16 bits of the input operand X are treated as a signed or an unsigned operand in the upper multiplier array 600.

Also, in the lower accumulator 615, the product is treated as an unsigned operand, while in the upper accumulator 605, the operand is treated as a signed number. It should be added that the 40-bit accumulator is treated as a signed number in all of the cases of FIGS. 7a and 7b. The reason for that is the guard bits, being an extension of the accumulator, allow bits so that even an unsigned number can be considered a positive part of the signed number. Therefore, the signed number in the extended accumulator encompasses both signed operands and unsigned operands.

FIG. 7b shows in more detail how the carry and sum bits interplay between the adders comprising the multiplier arrays 600 and 610. For example, the adders 625 and 635 are illustrated as part of the multiplier array 610, whereas the adders 620 and 630 are illustrated as part of the multiplier array 600. It should be noted that the multiplier arrays 610 and 600 are typically implemented by some arrangement of adders. And in specific implementations the interconnection of the adders may be done in various ways. FIG. 6b shows a simple cascading of adders but the same technique may be applied to other ways where the adders may be connected such as in Booth multipliers or Wallace Tree multipliers for example. As shown in FIG. 7b, the adder 625 in the lower multiplier array 610 provides a carry-out 621 which feeds into the carry-input of the corresponding adder 620 in the upper multiplier array 610. The lower multiplier array 610 performs the arithmetic as though the X-input input operand were unsigned. The sign of the input operand is specified into the sign control of the upper adders 620 and 630 of the upper multiplier 600 array.

Also, since the adders are connected in such a way that they are offset from the least significant bits of the multiplier to the most significant bits of the multiplier, it provides opportunity to add the sum bits back in. More specifically, the adders 625 and 620 correspond to the lesser significant bit of the multiplier with that lesser bit being Yi. The adders 635 and 630 correspond to the next more significant bit of the multiplier with that bit being Y(i+1). The offset can be seen as the output S1 of the adder 625 feeding to the input B0 of the adder 635 and S15 of the adder 625 feeding into the input B14 of the adder 635. That one bit offset frees up B15 of the input of adder 635 to accept the input 50 from the adder 620 so that the sum bit from the most significant multiplier array 600 is fed as an input-bit into the least significant multiplier array 610.

Also the sum bit S0 from the adder 625 goes directly to the next partial product shown as 640 and does not need to go through additional multiplier or adder stages. Thus, outputting S0 from a succession of adders stages 625, 635, and so forth, give rise to the output bits Z0 through Z15 of FIG. 6a. Output bits from the final partial product corresponding to S0 through S15 of the adder 635 would give rise to output bits from the array 610 of FIG. 6a of Z16 through Z31.

Those skilled in the art would appreciate how a final adder stage could be used to provide compensation should the multiplier Y be negative.

Operand Data Typing

A note should be made with respect to operand data typing. While one approach for specifying the operand mode type as scalar or vector is to include the information in the instruction, an alternate approach is to append the information to the operand in additional bits. For example, if the operand is 32 bits, one additional bit may be used to identify the operand as either a scalar or a vector. Additional bits may also be used if the number of vector elements were to be explicitly indicated, or the number of vector elements could be assumed to be some number such as two. The operand processing units would adapt for processing the operand as a scalar or as a vector by responding to the information appended to the operand.

Whether the operand is scalar or vector may also be specified by the way the operand is selected. For example, the information may be contained in a bit field in a memory location which also specifies the address of the operand.

If two operands were to be processed by the processing unit, and the mode information were different in the two operands, conventions could be designed into the processing unit by those skilled in the art for handling the mixed mode operations. For instance, an ADD operation involving a vector operand and a scalar operand could be handled by the processing unit by forming a vector from the scalar, truncating if necessary, and then performing a vector operation.

Time-sharing As An Alternate to Spatial Hardware

One skilled in the art would appreciate that time-sharing an implementation means can often be substituted for spatially distributed implementation means. For example, one vector adder can be used multiple times to effectively implement the multiple adders in a spatially distributed vector processing unit. Multiplexing and demultiplexing hardware can be used to sequence the input operands and the result. The vector adder with added support hardware can also be used to process the scalar operand in pieces in an analogous manner to how the distributed vector adders can be interconnected to process the scalar operand. The support hardware is used to process the intermediate results that pass among the vector processing elements.

With the above description of the present invention in mind, an exemplary RISC-type processor incorporating the space vector data path of the present invention will now be illustrated. It should be noted that the following processor system is merely one example of how those skilled in the art may incorporate the present invention. Others may find their own advantageous applications based on the present invention described.

An Exemplary Processor Incorporating The Present Invention

Reference is made to FIG. 8, where a functional diagram of a processing element incorporating the present invention is illustrated. While the following description makes reference to specific bit dimensions, those skilled in the art would appreciate that they are for illustration purposes and that other dimensions can readily be constructed in accordance with the teaching of the present invention.

Referring to FIG. 8, 32-bit instructions capable of specifying two source operands and a destination operand are used to control the data processing unit shown.

Operands are typically stored in registers and in data memory (200). Arithmetic, logic, and shift instructions are executed in ALU 240 and MAC 230 with operands from a register space and the results are returned to the register space. A register space consists of register file 220 and some other internal registers (not shown). Operands stored in the register space are either 32-bit words or halfword pairs. Operands are shuttled between the register space and memory 200 by load and store instructions, or an automatic memory accessing unit, streamer 210 as previously described.

Referring to FIG. 9, a functional block diagram of ALU 240 is shown.

The ALU consists of an adder 410, 420 and a barrel shifter 470. In general, ALU instructions take two operands from register space and write the result to register space. ALU instructions can execute each clock cycle, and require only one instruction clock cycle in the ALU pipe.

The adder 410, 420 and shifter 470 perform operations using word or halfword pair operands. Signed operands are represented in two's complement notation. Currently, signed, unsigned, fractional and integer operands can be specified by the instructions for the ALU operations.

Adder

The adder (410, 420) performs addition and logical operations on words and on halfword pairs. For halfword pair operations, the adder 410, 420 functions as two halves. The lower half 420 executes the operation using the halfword pairs' lower operands 460, and the upper half 410 executes the same operation using the halfword pairs' upper operands 450. When in a halfword pair mode, the two adders 410, 420 are essentially independent of each other. The 32-bit logic unit 440 is used to pass information from the lower adder unit 420 to upper adder 410 and back when the two adders are operating in a word mode.

Adder operations affect the two carry (CU and CL), two overflow (VU and VL), and two zero (ZU and ZL) condition code bits. CU is the carry flag for word operations; CU and CL are carry flags for halfword pair operations. Similarly, VU indicates overflows in word operations and VU and VL indicate overflows in halfword pair operations.

Overflows that affect the overflow flag can result from adder arithmetic instructions and from MAC scalar instructions. The overflow flags are set even if the executed instruction saturates the result. Once set, the condition codes remain unchanged until another instruction is encountered that can set the flags.

When an adder arithmetic instruction without saturation overflows, and the error exception is enabled, an error exception request occurs. Separate signals are sent to the debug logic to indicate an overflow with saturation and an overflow without.

Barrel Shifter

With reference to FIG. 9, during one clock cycle, the barrel shifter can shift all bits in a word operand up to 32 bit positions either left or right, while rotating or inserting a zero, the operand's sign bit, or the adder's upper carry flag (CU). For a halfword pair operation, in one clock cycle the shifter can shift both halfwords up to 16 bit positions left or right while rotating or inserting a zero, the sign bits, or the adder's carry flags (CU and CL).

For a typical shift/rotate operation, the barrel shifter 470 moves each bit in both source operands' positions in the direction indicated by the operation. With each shift in position, the barrel shifter 470 either rotates the end bit, or inserts the sign bit, the carry flag (CU or CL), or a zero depending on the operation selected.

For example, for rotate left, bits are shifted leftward. Bit31 is shifted into Bit0 in word mode. For halfword pair mode, Bit 31 is rotated into Bit16 and Bit15 is rotated into Bit0. For shift right, bits are shifted rightward. A zero is inserted into Bit31 in word mode. For halfword pair mode, a zero is inserted into both Bit31 and Bit15. Similarly, for shift with carry propagation, the carry flag (CU) is inserted into Bit31 in word mode. For halfword pair mode, each halfword's carry flag (CU and CL) is inserted into Bit31 and Bit15.

Reference is now made to FIG. 10. The dual-MAC unit consists of two MAC units 520, 550, 570, 590 and 510, 540, 560, 580 integrally interconnected so that they can produce either two 16-by-16 products or one 16-by-32 product. Each MAC consists of a 16-by-16 multiply array 510, 520, an accumulating adder 560, 570, an accumulator register file 580, 590, and a scaler 591.

Some exemplary instructions: Multiply, Accumulate, Multiply and Accumulate, Universal Halfword Pair Multiply, Universal Halfword Pair Multiply and Accumulate, Double Multiply Step, and Double Multiply and Accumulate Step, can be found in the Instruction Summary listed in FIG. 23.

Word operations can be executed in either MAC unit. It should be noted that a "word" as used in the MAC unit is 16-bit since the MAC's are currently 16×16 operations. A more convenient approach, however, is to use Vector Length 1, 2, 4 or 8 to describe the operation. As such, a word operation in the MAC can be referred to as a Vector Length 1, while a halfword pair operation would be Vector Length 2. The MAC containing the destination accumulator is the one currently used to perform the operation.

Halfword pair operations use both MAC units. The instructions specify a particular accumulator as the destination accumulator; this is the addressed accumulator. The MAC containing the addressed destination accumulator performs the operation on the lower halfword pair elements and the other ("corresponding") MAC performs the same operation on the upper halfword pair elements. The result from the corresponding MAC is stored in the corresponding accumulator, the addressed accumulator and the corresponding accumulator are in the same relative positions in their respective register files.

Double-precision operations are performed on a halfword and a word; the operation is performed by the two MACs combined as a double MAC. The "upper" MAC performs the most significant part of the computation and the "lower" MAC performs the lease significant part.

The MAC unit may support integral or fractional, and signed or unsigned, operands.

Accumulator Register File

The two MAC units are referred to as the upper MAC and the lower MAC. Each MAC has an accumulator register file consisting of four 40-bit guarded accumulator registers, for a total of eight accumulators in the ALU. Each guarded accumulator (AGn) consists of a 32-bit accumulator register (An) extended at the most significant end with an 8-bit guard register (Gn). FIG. 11 shows the layout of the accumulator register file.

The accumulator of halfword pair operands is stored in two accumulators. The lower elements of the halfword pairs accumulate as a 40-bit number in one accumulator of either MAC. The upper element of the halfword pairs accumulate as a 40-bit number in the corresponding accumulator in the other MAC (FIG. 12 shows the corresponding addresses).

Two accumulators are also used to store the results of a double precision step operation. The most significant portion of the result is stored in the guarded accumulator AG of the upper MAC. The least significant portion of the result is stored in the accumulator A of the lower MAC. The guard bits of the lower MAC accumulator are not used.

Each accumulator has two addresses in Register Space, referred to as the upper and lower accumulator address, or the upper and lower redundant address. (The assembly language names of these addresses for accumulator n are AnN and AnL respectively.) The effect of which address is used depends on how the register is used in the instruction; these effects are detailed in the following subsections.

The instruction formats (and assembly language) provide several methods of addressing accumulators:

As elements of Register Space. Each accumulator has a high and low address, in the range 112 to 127, with assembly-language symbols ARnH and ARnL.

As accumulator operands. The instruction format takes a number in the range 0–7; the corresponding assembly-language symbols are of the form An.

As accumulator operands, with separate high and low addresses. The instruction field takes a value in the range 0–15; the assembly language format is AnH or AnL.

Each of the eight guard registers has an address in Expanded Register Space (160–167; assembly language symbols have the form AGn).

The remaining subsections of this section specify the treatment of accumulators and guard registers as instructions. There are a number of special cases, depending on whether the register is a source or a destination, and whether the operation's elements are words or halfword pairs.

1. Accumulators as Word Source Operands

The upper accumulator address specifies the upper 32 bits of an accumulator An as a fractional word operand, and the lower address specifies the lower 32 bits of An as an integer word operand. In the current version of the processor, an accumulator is 32 bits long, so both addresses refer to the same 32 bits. However, the general processor architecture allows for longer accumulators.

The guard bits are ignored by those instructions which use accumulators (An in assembly language) as 32-bit source operands. Guard bits are included in the 40-bit source operands when instructions specify using guarded accumulators (assembly language AGn), such as for accumulating registers or as inputs to the scaler.

The bussing structure currently permits one accumulator register from each MAC to be used as an explicit source operand in any given instruction.

When an accumulator is selected as a source operand for a multiply operation, all 32 bits are presented by the accumulator. The instruction further selects, by the integer/fraction option, the lower or upper halfword for input to the multiply array.

2. Accumulators as Halfword-Pair Source Operands

Each element of a halfword pair is held in an accumulator as if it were a word operand. The two elements of a halfword pair are stored in corresponding accumulators in separate MACs. When used as accumulating registers or as inputs to the scalers within their respective MACs, they are used as 40-bit source operands.

Otherwise, the elements are assembled as two halfwords in a halfword pair operand. When the halfword pair source operand is the upper accumulator address, the upper halfword of the accumulator for each element is used. When the lower accumulator address is used, the lower halfword is used. The addressed accumulator provides the lower halfword and the corresponding accumulator provides the upper halfword. Either MAC can supply either element of the halfword pair.

3. Accumulators as Double-Precision Source Operands

The accumulators are used for precision source operands only in the double precision step operations. The addressed accumulator provides the least significant 32 bits, and the corresponding guarded accumulator provides the most significant 40 bits.

4. Guard Registers as Source Operands

An 8-bit guard register (Gx) can be accessed as a sign-extended integer directly from Expanded Register Space. When a guard register is the source operand of a halfword-pair is operation, the addressed guard becomes the least significant halfword operand, and the corresponding guard becomes the most significant halfword operand. In both cases, the guard register is sign-extended to 16 bits.

5. Accumulators as Word Designation Operands

For word operations using the MAC, the 32-bit result of a multiply operation is stored in the destination accumulator and sign extended through its guard register. The 40-bit result of an accumulating operation is stored into the destination guarded accumulator.

For other register-to-register instructions, the result is moved into the destination accumulator and sign extended through its guard register.

6. Accumulators as Word-Pair Designation Operands

For a Load instruction targeting an accumulator which specifies a word-pair data type conversion, the word from the lower memory address is loaded into the addressed accumulator; the least significant byte of the word from the higher memory address is loaded into the accumulator's guard register.

7. Accumulators as Halfword-Pair Destination Operands

For halfword pair operations using the two MAC units, the result of each MAC is stored in its accumulator file. The MAC containing the destination accumulator processes the lower halfword pair elements, and its 40-bit result is stored in that guarded accumulator (AG). The corresponding MAC processes the upper halfword pair elements, and its 40-bit result is stored in the corresponding guarded accumulator (AGC).

For other register-to-register instructions, the specific accumulator address selected for the destination accumulator determines how the result is stored. If the upper address is used, the least significant halfword is loaded into the most significant half of the selected accumulator, zero extended to the right, and sign extended through its guard register. The most significant halfword is loaded into the most significant half of the corresponding accumulator, zero extended to the right, and sign extended through its guard register. If the lower address is used, the least significant halfword is loaded into the least significant half of the selected accumulator, and sign extended through the most significant half of the selected accumulator and on through its guard register. The most significant halfword is loaded into the least significant half of the corresponding accumulator, and sign extended as above.

8. Accumulators as Double-Precision Operands

The least significant 32 bits of the result of a double precision multiply step operation is stored in the destination accumulator, and the most significant 40 bits are stored in the corresponding guarded accumulator. The guard bits of the destination accumulator are all set to zero.

9. Guard Registers as Destination Operands When a guard registers is a destination operand, the eight least significant bits of the result are stored in the addressed guard register. When a guard register is used as the destination operand of a halfword-pair operation, the eight least significant bits of the result are stored in the addressed guard register and the 8 least significant bits of the upper halfword are stored in the corresponding guard register.

Multiply Array

Reference is now made to FIG. 10. The multiply array, or multiply unit, for each MAC produces a 32-bit product from two 16-bit inputs. Signed and unsigned, integer and fractional inputs may be multiplied in any combination. For an integer input, the least significant halfword of the source operand is used. For a fractional input, the most significant halfword is used. FIG. 13 shows the scaling of inputs, and FIG. 14 shows output scaling.

If two word operands or one word and one immediate operand are being multiplied, only the MAC containing the destination accumulator is used. If two HP operands or one HP and one immediate operand are being multiplied, both MACs are used, and the MAC containing the destination accumulator multiplies the lower HP elements.

The two multiply arrays used together produce a 48-bit product from one 16-bit input and one 32-bit input scaled in accordance with FIG. 13. The product is scaled according to FIGS. 15-A, 15-B, 16-A, and 16-B.

Multiply Saturation

If −1.0 is multiplied by −1.0 (as 16-bit signed fractions) without an accumulation, the result (+1.0) is saturated to prevent an overflow into the guard bits: the maximum positive number is placed in the accumulator (A), and the guard bits are set to zero. If the multiply instruction includes an accumulation, the result is not saturated; instead, the full result is accumulated and placed in the destination guarded accumulator.

Multiply Scaling

FIGS. 13, 14, 15 and 16 show the scaling of source operands and of results for multiplication operations. The tables show the assumed location of radix points and the treatment of any sign bits.

FIG. 13 shows the scaling of the source operands for multiplication operations. FIG. 14 shows scaling for 32-bit products. FIGS. 15-A, 15-B, 16-A, and 16-B show the scaling for 48-bit products. (FIGS. 15-A and 15-B show the scaling of right-justified products in the lower and upper MAC, respectively; likewise FIGS. 16-A and 16-B show the scaling of left-justified products.)

Accumulating Adder

With reference made to FIG. 10, each MAC includes an accumulating adder, which can add an input to (or subtract an input from) an accumulator. Possible inputs are the product from the multiply array, an immediate operand, an accumulator from either MAC, or a register containing a word or a halfword pair.

An accumulation initialization feature is controlled by the IMAC (Inhibit MAC accumulate) bit of the status register (ST) (not shown). If an instruction is executed which performs a multiply/accumulate operation while the IMAC bit is True(=1), the destination accumulator is initialized to the input operand, and the IMAC bit is reset to False(=0). (In effect, the destination accumulator is set to 0 before the input is accumulated.)

A similar initialize-and-round feature is controlled by the IMAR bit of the status register. The execution of an instruction which performs an accumulating adder operation while the IMAR bit is True causes the accumulating register to be replaced by a rounding coefficient, the destination accumulator to be initialized to the input operand plus a round-up bit, and the IMAR bit to be reset to False. The rounding coefficient is all zeros except for a one in the most significant bit of the lower halfword.

Some multiply instructions include a round option which is executed in the accumulating adder. The rounded result is placed in the upper halfword of the destination accumulator and zero is placed in the lower halfword. The result should be considered to have a radix point between the lower and upper halfwords: the result is rounded to the nearest integer; and if the lower halfword is one half (i.e., the high-order bit is 1), the result is rounded to the nearest even integer.

An overflow of the accumulating adder does not set the overflow flag. When an overflow occurs for an accumulating Instruction with saturation option, the guarded accumulator is set to its most positive number or most negative number according to the direction of the overflow. If the instruction does not specify saturation, and if the error exception is enabled, then an overflow causes an error exception request. Separate signals are sent to the debug logic for overflows with saturation and overflows without.

FIG. 17 shows a word or accumulator operand being added to an accumulating register.

FIG. 18 shows a halfword pair operand (from a register or accumulator) being added to a halfword pair in accumulating registers.

FIG. 19 shows a product being added to an accumulating register.

FIG. 20 shows a halfword pair product being added to a halfword pair in accumulating registers.

FIG. 21 shows a 48-bit product being accumulated using the justify right option. This option applies to a 16×32 product where an integer result is desired, or the first step of a 32×32 product.

FIG. 22 shows a 48-bit product being accumulated using the justify left option. This option applies to a 16×32 product where a fractional result is desired, or the second step of a 32×32 product.

FIG. 23 is an instruction summary of operations which may be implemented in accordance with the space vector data path of the present invention.

Scaler

With reference made to FIG. 10, the scaler unit can perform a right barrel shift of 0 to 8 bit positions on the full length of a guarded accumulator. The most significant guard bit propagates into the vacated bits.

An overflow occurs during a scaler instruction when the guard bits and the most significant bit of the result do not all agree. (If these bits do agree, it means that the sign bit of the accumulator propagates though the entire guard register, and no overflow of the accumulator has occurred into the guard bits.)

The scaler instructions support an option to saturate the result when an overflow occurs. In this case, the result is set to the most positive number, or most negative number plus one lease significant bit depending on the direction of the overflow. (The most significant guard bit indicates whether the original number was positive or negative.)

When an overflow occurs and saturation was not specified, an error exception is raised if the error exception is enabled. Overflows without saturation and overflows with saturation are reported to the debug logic on separate signals.

A Move Scaled Accumulator to Register (MAR) can be used to normalize an accumulator. To normalize accumulator An:

MAR Rx, AnH, #8; scale AGn by 8 bits

MEXP Rc, Rx; measure exponent

SUBRU.W.SAT Rc, Rc, #8; calculate number of shifts necessary to normalize

MAR Rx, AnH, Rc ; normalize the accumulator's contents

After this sequence, Rc contains the number of shifts necessary to normalize the guarded accumulator, and Rx contains the normalized result.

Although the present invention has been described with reference to FIGS. 1–23, it will be appreciated that the teachings of the present invention may be applied to a variety of processing schemes as determined by those skilled in the art.

We claim:

1. A programmable processor, said programmable processor executing instructions in a first sequence as determined by an instruction fetch/decode/sequencer means for processing at least one operand, said operand comprising at least one element, each of said instructions comprising at least one field of at least one bit, said programmable processor comprising:

a) Mode specifying means responsive to said field of at least one bit in each instruction for specifying whether said operand is processed in either one of vector or scalar modes:

i) said vector mode designating that there are a plurality of elements within said operand, ii) said scalar mode designating that there is one element within said operand with said element comprising a plurality of sub-elements;

b) a processing unit coupled to said mode specifying means, comprising a plurality of sub-processing units, said processing unit receiving said one operand and, responsive to said instruction and to said mode specifying means, concurrently processing, in one cycle, said at least one operand in either one of vector or scalar modes as follows:

i) in said vector mode, each of said plurality of elements is received and processed by one of said sub-processing units configured in said vector mode to generate a vector output:

ii) in said scalar mode, each sub-element of said operand is received and processed by one of said sub-processing unit configured in said scalar mode to generate a scalar output, wherein said operand also comprises at least one logic condition further comprising compare means coupled to said processing unit for comparing said at least one logic condition in said operand in one of said scalar and vector modes with a predetermined logic condition, wherein said at least one logic condition is either one of a single logic condition or a selective combination of logic conditions in an operand, and wherein a first operand is conditionally moved from a first storage location to a second storage location based on said compare means, wherein said compare means comprises a plurality of sub-compares with each comparing corresponding elements within a second and a third operand to determine whether the corresponding element within the first operand is moved.

2. In a general-purpose computer comprising (1) a data memory for storing operands, each of said operands having at least one element within each operand, (2) an instruction memory for storing instructions for execution in a sequence, each instruction comprising at least one field of at least one bit, (3) instruction execution means for executing said instructions in a sequence, (4) a plurality of arithmetic logic units ("ALU's") for processing said operands to generate a sub-result with carry conditions for each ALU, an improvement for performing concurrent multiple data digital signal processing, comprising:

a) mode specifying means responsive to at least one bit in each instruction for specifying, whether each of the operands is processed in one of vector mode and scalar mode:

i) said vector mode designating that there are a plurality of elements within said operand, ii) said scalar mode designating that there is one element within said operand with said element comprising a plurality of sub-elements;

b) ALU control means, responsive to said mode specifying means, for selectively causing said plurality of ALU's to operate jointly as one unit in said scalar mode, and to operate independently as individual ALU's with each unit in said vector mode;

c) carry conditions means, coupled to said ALU control means and said plurality of ALU's, for selectively passing said carry conditions from each ALU among said plurality of ALU's in said scalar mode, and for ignoring said carry conditions for said plurality of ALU's in said vector mode, said signal processor further comprising instruction jump means for initiating a second sequence of executing instructions when either one of the following occurs:

a) when at least one condition code set coupled to said at least one element within said operand matches a first predetermined value, or b) when a selective combination of a plurality of condition code sets within an operand matches a second predetermined value, and said signal processor further comprising operand move means for selectively moving an operand from a first storage location to a second storage location within said data memory, when either one of the following occurs:
  a) when each condition code set associated with each individual element within said operand matches a third predetermined value;
  b) when the plurality of sets of condition codes in selective combination matches a fourth predetermined value, or
  c) when said one set of condition codes for said scalar operand matches a fifth predetermined value.

3. In a general-purpose computer comprising (1) a data memory for storing operands with each operand comprising at least one element, (2) an instruction memory for storing instructions for execution with each instruction comprising at least one field of at least one bit, (3) instruction execution means for executing said instructions in a sequence, an improvement for performing concurrent multiple data digital signal processing, comprising:
  a) mode specifying means responsive to said one field of at least one bit in each instruction for specifying, whether each of the operands is processed in one of vector mode and scalar mode:
    i) said vector mode designating that there are a plurality of elements within said operand,
    ii) said scalar mode designating that there is one element within said operand with said element comprising a plurality of subelements:
  b) a multiplier accumulator ("MAC") comprising a plurality of sub-MAC's coupled to said mode specifying means for performing the following operations:
    i) at least two 16-bit-by-16-bit multiply accumulation in one predetermined cycle,
    ii) one 16-bit-by 32-bit multiply accumulation in one predetermined cycle, or
    iii) one 32-bit-by-32-bit multiply accumulation in two predetermined cycles;
  c) MAC control means coupled to each of said plurality of sub-MAC's, responsive to said mode specifying means, for selectively causing each of said plurality of sub-MAC's to operate independently from each other in said vector mode, and to operate jointly in said scalar mode.

4. The improvement according to claim 3, wherein:
  said MAC comprises a 16-bit by 32-bit multiply accumulator; and each of said sub-MAC's comprise a 16-bit by 16-bit multiply accumulator.

5. A programmable processor for concurrently processing a plurality of data paths using a general-purpose computer, said general-purpose computer comprising data memory for storing at least one operand, said operand comprising at least one element, memory access bus for transferring the operands from the data memory, instruction memory for storing instructions for execution in a sequence, each of said instructions comprising at least one field of at least one bit, instruction execution means coupled to an instruction memory for fetching, decoding and sequencing said instructions to said sequence, said programmable processor comprising:
  a) Mode specifying means responsive to said at least one bit in each instruction for specifying whether said operand is processed in either one of vector or scalar modes:
    (i) said vector mode indicating to said plurality of data paths that there are a plurality of elements within said operand,
    (ii) said scalar mode indicating to said plurality of data paths that there is one element within said operand with said element comprising a plurality of sub-elements;
  b) a plurality of sub-processing units for concurrently processing said at least one operand, coupled to said mode specifying means comprising:
    (i) a plurality of arithmetic units coupled to said instruction execution means, operative in one of said vector and scalar modes, said arithmetic units receiving and independently and concurrently processing said at least one element from an operand in said vector mode as specified by said mode specifying means, and each of said arithmetic units receiving and jointly processing an operand in said scalar mode as specified by said mode specifying means, each of said plurality of arithmetic units generating a carry-out status after processing said operand in both of said vector and scalar modes, and
    (ii) a plurality of multiplier accumulators (MAC's) coupled to said instruction execution means operative in one of said vector and scalar modes for performing multiply accumulations, each of said plurality of MAC's receiving and independently and concurrently processing said at least one element within an operand in said vector mode as specified by said mode specifying means, and said plurality of MAC's receiving and jointly and concurrently processing an operand with each of said plurality of said MAC's corresponding to a sub-element of said operand in said scalar mode specified by said mode specifying means;
  c) arithmetic control means, coupled to said plurality of arithmetic units for passing said carry-out status among each of said plurality of arithmetic units in said scalar mode such that said plurality of arithmetic units process said operand in said scalar mode to generate a scalar result and for disabling said carry conditions corresponding to each of said plurality of arithmetic units in said vector mode;
  d) MAC control means coupled to said plurality of MAC's, responsive to said mode specifying means, for causing said plurality of MAC's to operate independently from each other in said vector mode by generating said plurality of results for said plurality of elements, and to operate jointly in said scalar mode by combining a processing result for each sub-element into one result.

6. A programmable processor according to claim 5, further comprising:
  a) a plurality of shifters coupled to said instruction execution means, for selectively operating jointly in said scalar mode, and independently in said vector mode, each of said plurality of shifters, responsive to said mode specifying means, receiving and independently and concurrently processing said at least one element from an operand in said vector mode as specified by said mode specifying means to generate to generate at least one shifted sub-result, said plurality of shifters, responsive to said mode specifying means in said scalar mode, receiving and jointly processing an operand to generate a shifted result from said operand;
  b) shifter control means coupled to said shifters for passing shifted operand bits among each of said plurality of shifters in said scalar mode such that said plurality of shifters process said scalar operand, said shifter control means disabling the passing of shifted operand bits from each of said plurality of shifters in said vector mode.

7. In a general-purpose computer comprising (1) a data memory for storing operands, each of said operands having at least one element within each operand, (2) an instruction memory for storing instructions for execution in a sequence, each instruction comprising at least one field of at least one bit, (3) instruction execution means for executing said instructions in a sequence, (4) a plurality of arithmetic logic units ("ALU's") for processing said operands to generate a sub-result with carry conditions for each ALU, an improvement for performing concurrent multiple data digital signal processing, comprising:

a) mode specifying means responsive to at least one bit in each instruction for specifying, whether each of the operands is processed in one of vector mode and scalar mode:

i) said vector mode designating that there are a plurality of elements within said operand, ii) said scalar mode designating that there is one element within said operand with said element comprising a plurality of sub-elements;

b) ALU control means, responsive to said mode specifying means, for selectively causing said plurality of ALU's to operate jointly as one unit in said scalar mode, and to operate independently as individual ALU's with each unit in said vector mode;

c) operand move means for selectively moving an operand from a first storage location to a second storage location within said data memory, when either one of the following occurs:

i) when each condition code set associated with each individual element within said operand matches a third predetermined value;

ii) when the plurality of sets of condition codes in selective combination matches a fourth predetermined value, or iii) when said one set of condition codes for said scalar operand matches a fifth predetermined value.

* * * * *